United States Patent
Hieda

(10) Patent No.: US 7,856,652 B2
(45) Date of Patent: Dec. 21, 2010

(54) ACCESS CONTROL MANAGEMENT METHOD, ACCESS CONTROL MANAGEMENT SYSTEM AND TERMINAL DEVICE WITH ACCESS CONTROL MANAGEMENT FUNCTION

(75) Inventor: Satoshi Hieda, Tokyo (JP)

(73) Assignee: NEC Corporation, Tokyo (JP)

( * ) Notice: Subject to any disclaimer, the term of this patent is extended or adjusted under 35 U.S.C. 154(b) by 1066 days.

(21) Appl. No.: 11/064,220

(22) Filed: Feb. 23, 2005

(65) Prior Publication Data

US 2006/0191017 A1 Aug. 24, 2006

(30) Foreign Application Priority Data

Feb. 23, 2004 (JP) ............................. 2004-045924

(51) Int. Cl.
- H04L 29/00 (2006.01)
- G06F 17/00 (2006.01)
- G06F 17/30 (2006.01)

(52) U.S. Cl. ..................... 726/1; 726/4; 726/17; 726/27
(58) Field of Classification Search ........................ None
See application file for complete search history.

(56) References Cited

U.S. PATENT DOCUMENTS

| | | | |
|---|---|---|---|
| 6,216,041 B1 | 4/2001 | Tierney et al. | |
| 6,459,891 B1 | 10/2002 | Whinnett et al. | |
| 2003/0092428 A1* | 5/2003 | Awada et al. | 455/414 |
| 2003/0177389 A1* | 9/2003 | Albert et al. | 713/201 |
| 2004/0123150 A1* | 6/2004 | Wright et al. | 713/201 |
| 2004/0128394 A1* | 7/2004 | Knauerhase et al. | 709/229 |

FOREIGN PATENT DOCUMENTS

| | | | |
|---|---|---|---|
| EP | 1 162 853 A1 | 12/2001 | |
| EP | 1162853 A1 * | 12/2001 | |
| EP | 1 255 179 A3 | 11/2002 | |
| EP | 1 367 843 A1 | 12/2003 | |
| GB | 2 348 573 A | 10/2000 | |

(Continued)

OTHER PUBLICATIONS

Tresys Technology, "SE Linux Conditional Policy Language Extension", Internet <URL, http://www.tresys.com/selinus/heckpolicy_prototype.html>.

(Continued)

*Primary Examiner*—Nasser Moazzami
*Assistant Examiner*—Fatoumata Traore
(74) *Attorney, Agent, or Firm*—Scully, Scott, Murphy & Presser, P.C.

(57) ABSTRACT

An environment information distribution unit transmits a policy ID for specifying an access policy to be applied to a terminal device. An environment information reception unit notifies an access policy application management unit of a policy ID specified based on information received from the environment information distribution unit. The access policy application management unit specifies a relevant access policy from an access policy storage region which stores at least one access policy based on a notified policy ID to notify an access control management unit in an OS of information designating the access policy. The access control management unit determines whether to allow or not to allow a request from a subject to access an object based on a specified access policy.

7 Claims, 17 Drawing Sheets

FOREIGN PATENT DOCUMENTS

| | | |
|---|---|---|
| GB | 2 368 497 A | 5/2002 |
| GB | 2 379 764 A | 3/2003 |
| JP | 2000-163379 | 6/2000 |
| JP | 2001-025070 | 1/2001 |
| JP | 2001-195294 A | 7/2001 |

OTHER PUBLICATIONS

Minoru Shibamiya, "Technology of a Security Management", Juse Press, Ltd., Jul. 30, 1993, vol. 1, pp. 51-54.

Japanese Official Action dated Apr. 27, 2010, together with English-language translation.

* cited by examiner

FIG. 2

| STORAGE PLACE | POLICY ID | ACCESS POLICY |
|---|---|---|
| A | a | CAMERA PHOTOGRAPHING INHIBITED |
| B | b | CALLING TONE INHIBITED |
| ⋮ | ⋮ | ⋮ |
| N | n | DIALING AND INCOMING CALL INHIBITED / CAMERA PHOTOGRAPHING INHIBITED |

FIG.10

| ID INFORMATION | KIND | POLICY ID |
|---|---|---|
| 0010295 | | |
| 0731214 | | |
| 2250167 | CONCERT HALL | j |
| ⋮ | | |
| 6340101 | | |
| 0499474 | | |
| 0618330 | | |
| ⋮ | BOOK STORE | a |
| 8790356 | | |
| ⋮ | ⋮ | ⋮ |

FIG.11

| POSITION INFORMATION | | KIND | POLICY ID |
|---|---|---|---|
| EAST LONGITUDE | NORTH LATITUDE | | |
| 138° 32' 50" | 38° 01' 23" | | |
| ⋮ | ⋮ | CONCERT HALL | j |
| 138° 55' 27" | 38° 40' 11" | | |
| ⋮ | ⋮ | ⋮ | ⋮ |

ACCESS CONTROL MANAGEMENT METHOD, ACCESS CONTROL MANAGEMENT SYSTEM AND TERMINAL DEVICE WITH ACCESS CONTROL MANAGEMENT FUNCTION

BACKGROUND OF THE INVENTION

1. Field of the Invention

The present invention relates to an access control management method, an access control management system and a terminal device with an access control management function which dynamically change a function to be used of a terminal device having a wired communication function or a radio communication function.

2. Description of the Related Art

As functions of portable terminal devices such as portable phones have been diversified, there have been an increasing demand for limiting the functions of portable terminal devices. It is desirable, for example, in a conference hall or a concert hall to stop a calling function or an incoming call ringing function of a portable telephone. In an art gallery or a book store, it is desirable to stop a photographing function of a portable terminal device with a camera. Under these circumstances, proposed is a system in which when a portable terminal device with a plurality of levels of use limit information stored in advance moves to a predetermined position, a base station designates use limit information related to the position (see e.g. Japanese Patent Laying-Open (Kokai) No. 2001-25070 (hereinafter referred to as Literature 1)). A control mechanism provided in the portable terminal device sets an internal state of the portable terminal device to be a state according to designated use limit information. Control mechanism of a portable terminal device in general includes a microprocessor which executes control processing according to an operating system (OS) and an application program.

Recited in Japanese Patent Laying-Open (Kokai) No. 2000-163379 (hereinafter referred to as Literature 2) is one example of a method of changing access control according to position information. More specifically, recited is a method of a terminal device of accessing only information according to its current position from a CD-ROM in which numbers of information is stored. "Access control" in the present specification denotes definition about which object is accessible by a subject in a terminal device. Here, subject represents an accessing body called a process, a program or an application. Object represents a resource managed in an OS such as a file or a directory (an arbitrary tool requested by a job or a task (equivalent to an object here) in a system using a computer, which includes a CPU, a storage device, an I/O device and a control program).

Furthermore, recited in Tresys Technology [searched on Jan. 23, 2004], Internet <URL: http://www.tresys.com/selinux/heckpolicy_prototype.html> (hereinafter referred to as Literature 3) is one example of a method of dynamically changing access control.

The system recited in Literature 1 is provided with a position detecting device which detects a current position of each portable terminal device existing in the system. The position detecting device detects the current position of each portable terminal device through a plurality of base stations and determines whether a function of each portable terminal device should be limited or not based on the detected current position. Then, when determining that the function of the portable terminal device should be limited, transmit function limiting information to the portable terminal device through the base station. The portable terminal device limits its own function based on use limit information designated by the function limiting information.

In such a system, disposing a position detecting device which detects every current position in the system increases costs for controlling functions of the portable terminal device as a whole of the system. In addition, while limiting a function of a portable terminal device is required by a demand of realizing a system inside a specific building or in a narrow region in proximity to the building, the system recited in Literature 1 finds it difficult to execute such strict position detection as satisfies the demand. Moreover, after a portable terminal device is brought into a building which allows no communication with a base station, function limiting information can not be transmitted to the portable terminal device.

On the other hand, with the access control management method recited in Literature 2, setting an access policy for each object in a terminal device is not possible. Neither possible is dynamically changing access control. The access control management method recited in Literature 3 requires one access policy covering access policies of all the geographical regions in which a terminal device is expected to locate to be prepared in advance, resulting in increasing a storage capacity in the terminal device. Moreover, it is impossible to cope with addition of an access policy related to a new geographical region.

SUMMARY OF THE INVENTION

The present invention accordingly aims at providing an access control management method, an access control management system and a terminal device with an access control management function which enable an access control method most suitable for an environments in which a terminal device is located to be reliably selected while suppressing an increase in costs of the entire system.

According to the present invention, an access control management system which limits a request from an application program to access resources for realizing functions owned by a terminal device mounted with the application program includes an environment information transmission device which transmits environment information as information that can specify an environment in which the terminal device is placed, in which system the terminal device includes an environment information reception unit which receives environment information from the environment information transmission device, an access policy selection unit which selects an access policy that indicates for which resource from which application program access should be limited and that is adapted to environment information, and an access control management unit which executes access control for limiting an access request from the application program according to an access policy selected by the access policy selection unit.

According to the access control management system of the present invention, the access control management unit is preferably included in an operating system mounted on the terminal device such that the access control management unit can not be directly called up from the application program.

The access control management system of the present invention may be structured to have an external data base which holds access policies, in which the terminal device includes a storage unit which stores at least one access policy and an access policy download unit which downloads an access policy adapted to environment information from the external data base and makes the storage unit store the access policy such that the access control management unit takes out an access policy adapted to environment information from the storage unit to execute access control based on the taken out access policy.

In the access control management system of the present invention, the terminal device may be structured to have an access policy operation management unit which checks whether there exists an access policy adapted to environment information in the storage unit such that when there exists in the storage unit no access policy which is adapted to environment information, the access policy operation management unit asks the access policy download unit to download the access policy.

The access control management system of the present invention may be structured to have a plurality of external data bases, in which the environment information transmission device transmits information which specifies an external data base holding environment information and the access policy operation management unit specifies one external data base from the plurality of data bases based on the information received from the environment information transmission device to ask the access policy download unit to download an access policy from the specified external data base.

In the access control management system of the present invention, the environment information transmission device may be structured to transmit an access policy itself adapted to an environment as environment information.

Another access control management system according to the present invention includes an environment information transmission device which transmits environment information as information that can specify an environment in which the terminal device is placed and a conversion device which provides a corresponding relationship between environment information and access policies, in which the terminal device includes a storage unit which stores at least one access policy, an environment information reception unit which receives environment information from the environment information transmission device, an environment information notification unit which requests, to the conversion device, for specific information that specifies an access policy which indicates for which resource from which application program access should be limited and which is adapted to received environment information, an access policy selection unit which selects an access policy indicated by specific information provided by the conversion device from the storage unit, and an access control management unit which executes access control for limiting an access request from the application program according to an access policy selected by the access policy selection unit.

In another access control management system of the present invention, the terminal device is structured to include an access policy operation management unit which checks whether there exists in the storage unit an access policy indicated by specific information provided by the conversion device and an access policy download unit which downloads an access policy adapted to environment information from an external data base to make the storage unit store the policy such that when there exists no access policy indicated by specific information in the storage unit, the access policy operation management unit asks the access policy download unit to download the access policy.

Moreover, a further aspect of the invention, in an access control management method which limits a request from an application program to access resources for use in realizing functions owned by a terminal device mounted with an operating system and the application program, the terminal device, externally receives environment information which is information that can specify an environment in which the terminal device is placed, selects an access policy that indicates for which resource from which application program access should be limited and that is adapted to the environment information, and executes access control of limiting an access request from the application program according to a selected access policy.

According to a still further aspect of the invention, a terminal device with an access control management function which is mounted with an application program and limits a request from the application program to access resources for use in realizing functions, comprises an environment information reception unit which externally receives environment information as information that can specify an environment in which the terminal device is located, an access policy selection unit which selects an access policy that indicates for which resource from which application program access should be limited and that is adapted to the environment information, and an access control management unit which executes access control of limiting an access request from the application program according to an access policy selected by the access policy selection unit.

The terminal device with an access control management function is preferably used as a portable telephone.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is an explanatory diagram showing an example of arrangement of contents in an access policy storage region;

FIG. 10 is an explanatory diagram showing one example of a table of corresponding relationships between environment information and policy IDs held by an environment information/policy ID conversion unit;

FIG. 11 is an explanatory diagram showing another example of a table of corresponding relationships between environment information and policy Ids;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First Embodiment

Figure 1:
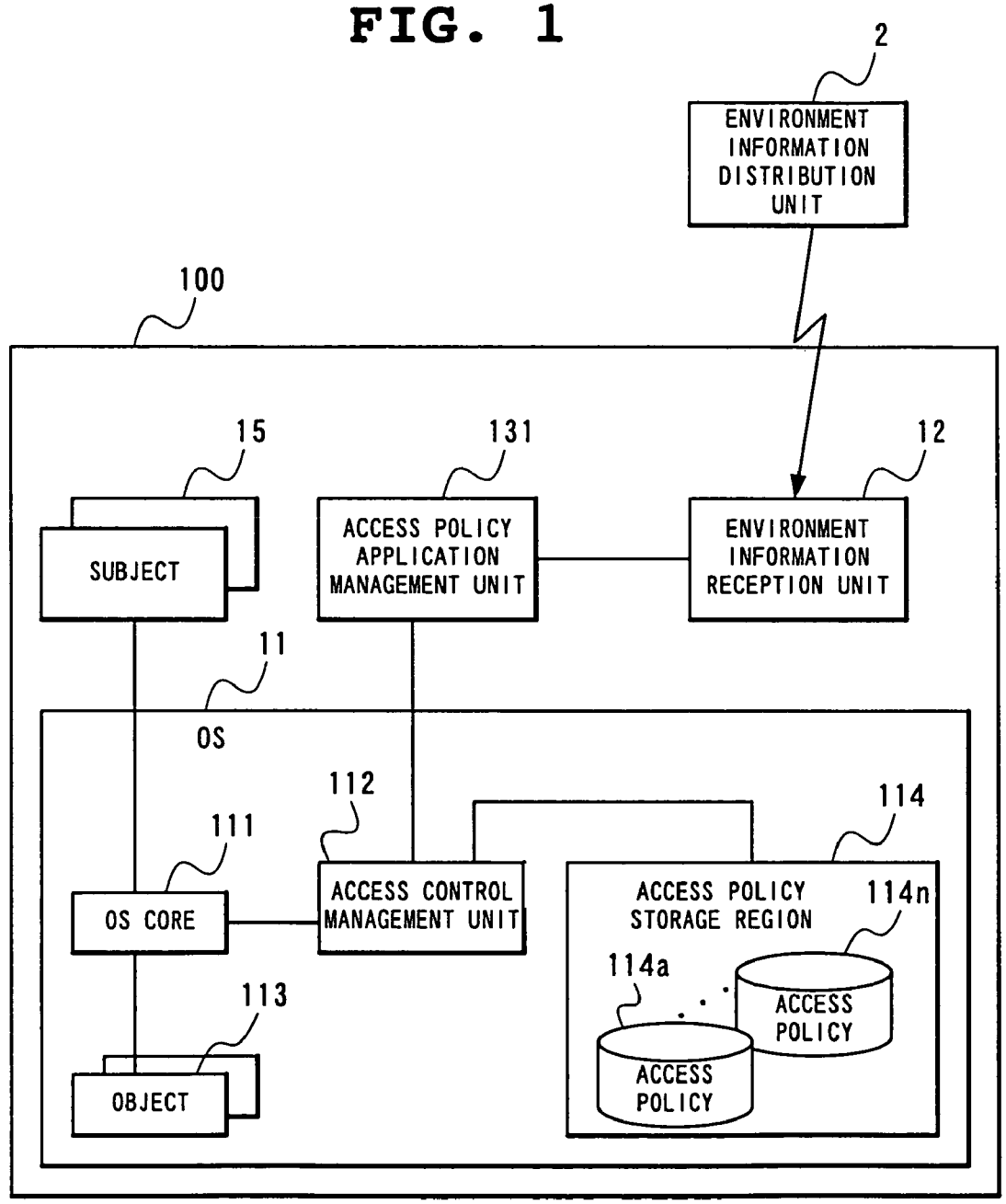
FIG. 1 is a block diagram showing a structure of an access control management system according to a first embodiment of the present invention.

FIG. 1 is a block diagram showing a first embodiment of an access control management system according to the present invention. While the access control method according to the present invention is suitably applied to a portable radio terminal device such as a portable telephone, the terminal device is not limited to a portable type terminal device having a radio communication function but applicable to various devices having various kinds of functions which are expected to have a need of limitation according to environments. In addition, the terminal device is applicable not only to a device having a radio communication function but also to a device which receives environment information which will be described in the following by wired communication.

Here, environment information is information which can specify an environment in which a terminal device 100 exists. Accordingly, because such a policy ID as will be described below is information for identifying an access policy adapted to an environment, it is included in environment information. In addition, because ID information unitarily assigned to each building or the like can specify a building or the like itself or an environment surrounding the building or the like, it is included in environment information. Furthermore, because a signal from a GPS satellite enables specification of a position as an environment based on the signal, it is included in environment information. Position information created based on a signal from a GPS satellite is also included in environment information. In addition, because an access policy itself accords with an environment as will be described in the following, it is a kind of environment information.

Even when the terminal device 100 receives environment information as information which can specify an environment, it in particular does not recognize an environment in which it exists. The terminal device 100 disposed in a book store, for example, needs not recognize that itself exists in the book store but simply recognizes a policy ID for applying an access policy adapted to the book store.

As illustrated in FIG. 1, the access control management system according to the first embodiment includes the terminal device 100 having a radio communication function and an environment information distribution unit 2. The terminal device 100 includes an OS 11, an environment information reception unit 12, an access policy application management unit 131 and at least one subject 15. The OS 11 includes an OS core 111, an access control management unit 112 and a plurality of objects 113. In the OS 11, there exists an access policy storage region 114 in which at least one access policies 114a to 114n are stored.

The environment information distribution unit 2 has a function of transmitting identification information itself (policy ID) for specifying an access policy to be applied to the terminal device 100 or information which can specify a policy ID. Access policy varies with an environment (geographical environment etc.) in which the terminal device 100 is placed. Geographical environment denotes an absolute position of the terminal device 100 represented by a latitude or a longitude and an external environment of the terminal device 100 such as a specific building. The environment information distribution unit 2 is more specifically a GPS satellite or a transmitter which transmits a code of a policy ID by radio waves or an infrared ray, for example. Such a transmitter is disposed in the surrounding of an entrance of a specific building (concert hall or book store) or the like. Then, in a case where the environment information distribution unit 2 is such a transmitter as described above, a policy ID or information which can specify a policy ID is set in advance at the transmitter. Information which can specify a policy ID is, for example, ID information unitarily assigned to a building equipped with a transmitter.

The environment information reception unit 12 notifies the access policy application management unit 131 of a policy ID specified based on information received from the environment information distribution unit 2. Based on the notified policy ID, the access policy application management unit 131 specifies a relevant access policy from the access policy storage region 114 which stores at least one access policy and notifies the access control management unit 112 in the OS 11 of information (or may be a policy ID itself) which designates the access policy. Accordingly, the access policy application management unit 131 is also an access policy selection unit which selects an access policy adapted to environment information. After the access policy application management unit 131 reads the access policy itself, it may output the policy to the access control management unit 112.

Access policy is data describing an access form allowable at the time when the subject 15 accesses the object 113. Allowable access form is described for each of various subjects 15 in a computer system contained in the terminal device 100. Described as policies are such information as a subject A can create an object A and a subject B can read an object B but can not write the same. The subject 15 is an accessing body called process, program and application, which issues an access request to the OS core 111 when using the object 113 managed in the OS 11.

When an access request is issued to the object 113 in the OS 11 from the subject 15, the OS core 111 inquires of the access control management unit 112 whether the request should be accepted. When determination that the request reception is allowed is returned as a result, accept the access request to execute the access request. When determination that reception is not allowed is returned, return the determination to the subject 15 as a requesting source. The core function of a so-called OS kernel is equivalent to the OS core 111.

Based on an access policy selected from among the access policies 114a to 114n, the access control management unit 112 determines whether an access request is allowed or not allowed to an inquiry from the OS core 111. The object 113 is such a resource managed in the OS 11 as a file or a directory and, more particularly, a software resource for executing a function mounted on a device such as a device driver. Resource for executing a function mounted on the device is not limited to a software resource but may be a hardware resource (e.g. a switch for making use of or limiting a function).

Each of the access policies 114a to 114n has description of an access control method. The access control method includes at least one policy (indicating whether access to a resource is allowed/not allowed). More specifically, in the present specification, each of the access policies 114a to 114n denotes information including at least one policy. Access control represents control of an access method for each of at least one resource. In other words, access control denotes management of accessing/not-accessing of each resource (more specifically, accessible/not accessible).

FIG. 2 is an explanatory diagram showing an example of arrangement of the contents of the access policy storage region 114. In the example shown in FIG. 2, a plurality of kinds of access policies are stored to correspond to policy IDs. Storage position illustrated in FIG. 2 is more specifically an address of the access policy storage region 114 (a ROM 22 in the arrangement shown in FIG. 3 below).

Figure 3:
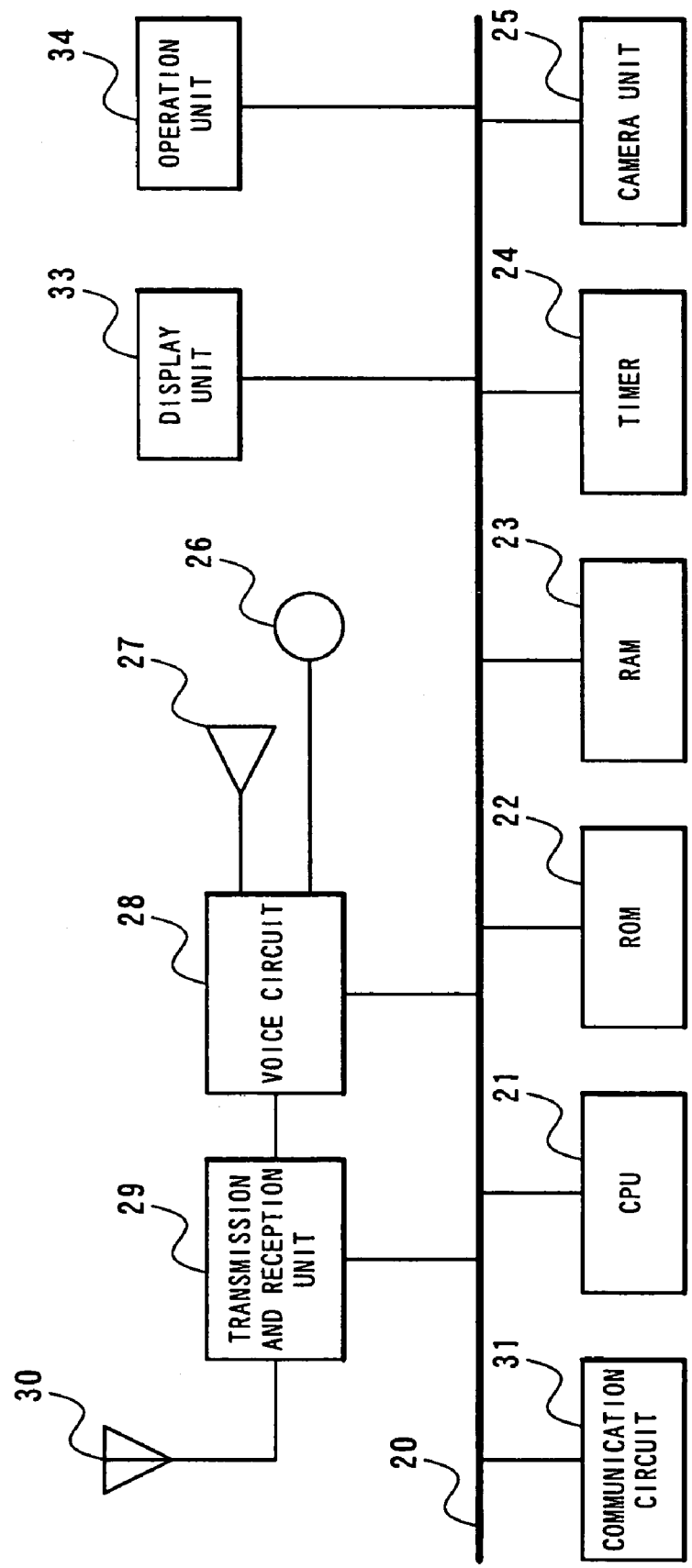
FIG. 3 is a block diagram showing an example of function arrangement of a portable telephone as a terminal device.

FIG. 3 is a block diagram showing function arrangement of the terminal device 100 when a portable telephone is used as the terminal device 100. As shown in FIG. 3, a CPU 21 which executes control operation according to an OS program and an application program, the ROM 22 in which a program or the like is stored, a RAM 23 used as a temporary storage memory when the CPU 21 executes control operation, a timer 24 which counts time and a camera unit 25 having a camera module including a lens, an image processing circuit or the like are connected by a bus 20. The timer 24 may be contained in the CPU 21. The ROM 22 also includes a flush memory which stores data of a telephone list and the like. Then, a display unit 33 including an LCD etc. and a display driving circuit, and an operation unit 34 including a dial key are connected to the bus 20.

Further connected to the bus 20 are a voice circuit 28 which converts a voice signal from a microphone 26 into a digital signal and outputs a voice signal contained in a received signal to a speaker 27, and a transmission and reception unit 29 which, after modulating data from the voice circuit 28 or the CPU 21 and frequency-converting the data, outputs a radio frequency signal to an antenna 30, as well as frequency-converting a radio frequency signal received at the antenna 30 or demodulating the signal to output the obtained signal to the voice circuit 28 or the CPU 21. The transmission and reception unit 29 conducts transmission and reception to/from a base station in a portable telephone communication network through the antenna 30.

In a case where the environment information distribution unit 2 illustrated in FIG. 1 is structured to transmit a policy ID by radio waves or an infrared ray, a communication circuit 31 for receiving radio waves or an infrared ray is provided. In a case where the environment information distribution unit 2 is structured to transmit a policy ID by radio waves, the communication circuit 31 is a circuit, for example, which communicates according to Bluetooth standards and includes an antenna. In a case where the environment information distribution unit 2 is structured to transmit a policy ID by an infrared ray, the communication circuit 31 is a circuit, for example, which communicates according to IrDA standards and includes an infrared ray transmitter.

Figure 4:
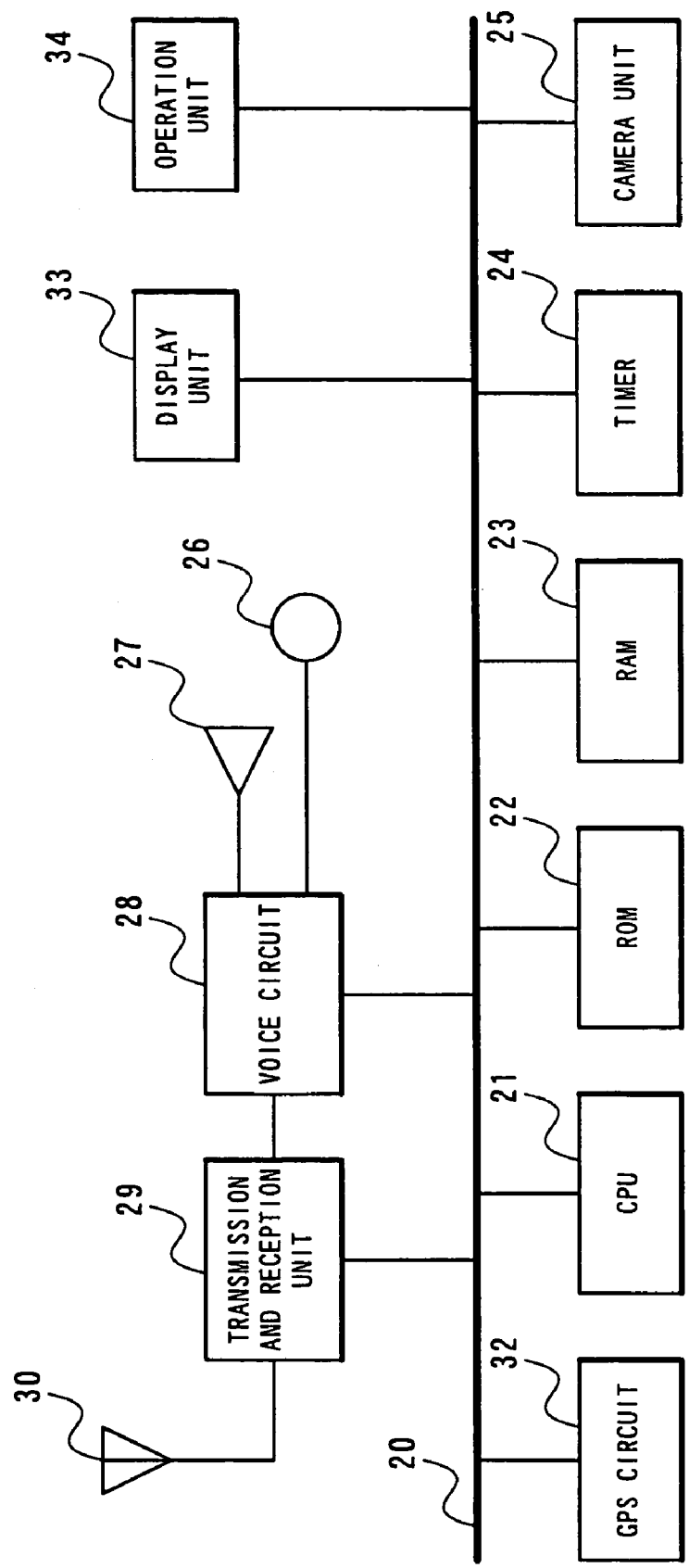
FIG. 4 is a block diagram showing another example of function arrangement of a portable telephone as a terminal device.

In a case where the environment information distribution unit 2 is a GPS satellite, a GPS circuit 32 is provided which receives radio waves from a plurality of GPS satellites and based on the received radio waves, calculates a latitude and a longitude of a place where the terminal device 100 is currently placed as illustrated in FIG. 4.

The environment information reception unit 12 illustrated in FIG. 1 is realized by the communication circuit 31 in the terminal device 100 and the CPU 21 operable based on a program which extracts ID information or the like from a signal received by the communication circuit 31. The subject 15, the object 113, the access control management unit 112 and the access policy application management unit 131 are realized by the CPU 21 operable based on a program. The access policy storage region 114 is realized by the ROM 22.

Figure 5:
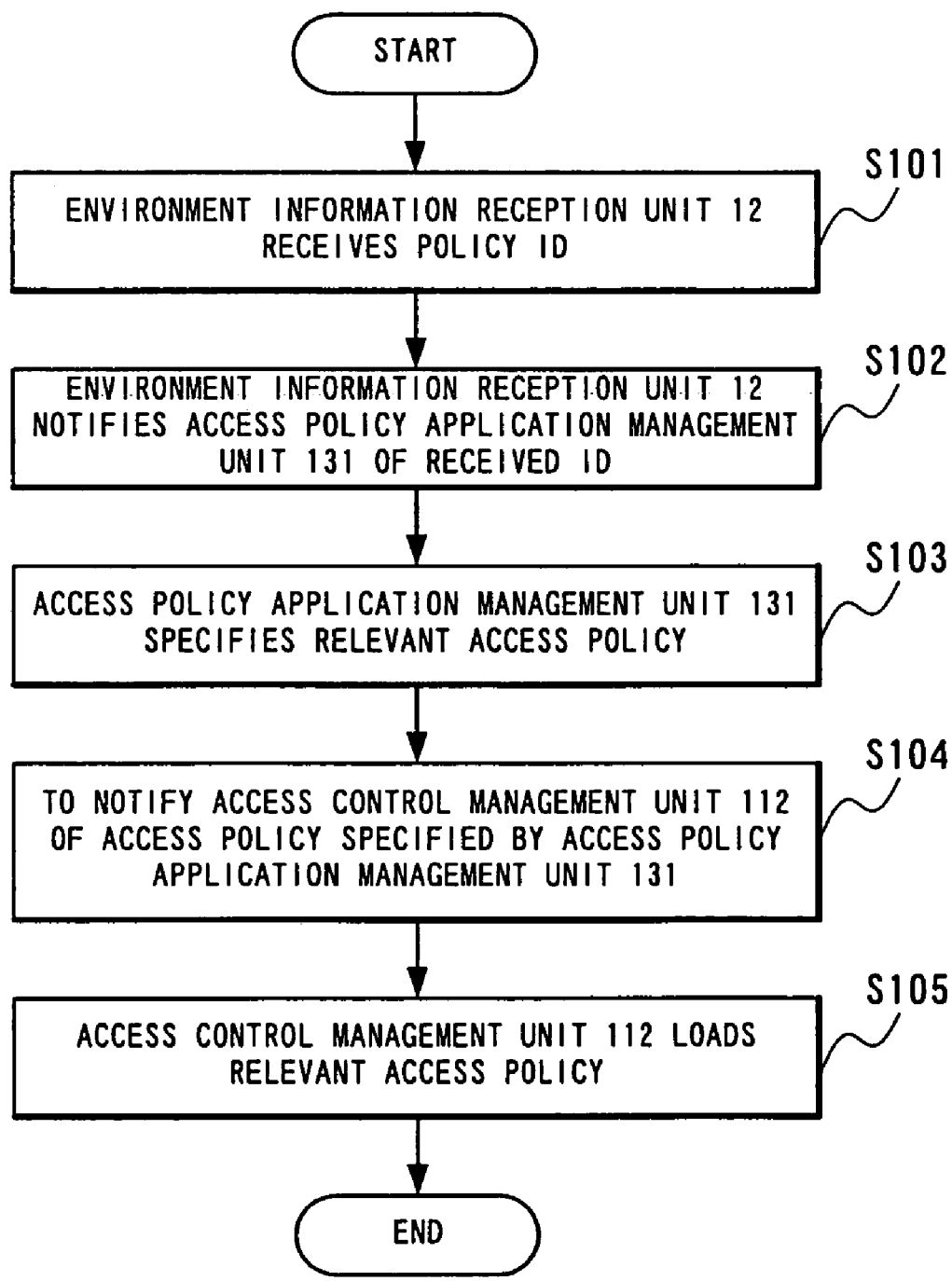
FIG. 5 is a flow chart showing operation of the first embodiment.

Next, description will be made of operation of the first embodiment with reference to the flow chart shown in FIG. 5. Assume here is a case where used as the environment information distribution unit 2 is a transmitter which transmits a policy ID code as radio waves. First, in the terminal device 100, when entering a region in which radio waves from the environment information distribution unit 2 can be received, the environment information reception unit 12 receives a policy ID of an access policy to be applied from the environment information distribution unit 2 (Step S101). The environment information distribution unit 2 transmits an optimum policy ID according to a position where the environment information distribution unit 2 is disposed. "Optimum access policy" is an access policy including a policy which actually limits a function that needs to be limited among various kinds of functions of the terminal device 100 under such an environment as a position where the environment information distribution unit 2 is disposed. It is, for example, an access policy including a policy of stopping incoming call ringing of a portable telephone at a position where a concert hall locates.

The environment information reception unit 12 notifies the access policy application management unit 131 of the received policy ID (Step S102). The access policy application management unit 131 specifies a relevant access policy based on the notified policy ID (Step S103) to notify the access control management unit 112 in the OS 11 of information which designates the specified access policy (Step S104). Then, the access control management unit 112 loads the designated access policy from the access policy storage region 114 (Step S105).

As described above, when the subject 15 accesses the object 113 in the OS 11, the subject 15 first issues an access request to the object 113 to the OS core 111. Upon receiving the request, the OS core 111 inquires of the access control management unit 112 whether the request is allowed. The access control management unit 112 collates the inquiry contents from the OS core 111 and description of an access policy to make a reply that the access is allowed or a reply that it is not allowed. When receiving a reply of allowance, the OS core 111 returns processing to the application after actually accessing the object 113. When the determination that the access is not acceptable is returned, return the reply to that effect to the subject 15 as a requesting source.

When the terminal device 100 moves to receive a different policy ID from other environment information distribution unit 2, the access control management unit 112 loads a different access policy from the access policy storage region 114.

Thus, since the present embodiment allows environment information obtained by the environment information reception unit 12 from the environment information distribution unit 2 to vary with an environment in which the terminal device 100 is placed, access control of an object in the OS is possible using an access policy most suitable for the environment in which the terminal device 100 is currently placed.

As an example, assume a case where with the terminal device 100 as a portable telephone provided with a camera, the subject 15 is a photographing application which causes execution of camera photographing by user operation to store execution results in a storage unit of the terminal device 100. Then, assume that the environment information distribution unit 2 disposed at a book store transmits a policy ID including description that "a photographing application can not access a camera driving object". Then, the above-described control results in describing in an access policy loaded into the access control management unit 112 that "a photographing application can not access a camera driving object". As a result, even when the photographing application makes a request for accessing a camera driving object as the object 113 to the OS core 111, the request will not be accepted.

Accordingly, it will be possible, for example, to invalidate the camera photographing function of the terminal device 100 at a book store. With the environment information distribution unit 2 disposed at an entrance of a book store, transmit a policy ID containing contents that "operation of accessing the camera photographing function of the terminal device 100 is not allowed". Then, the access policy that "operation of accessing the camera photographing function of the terminal device 100 is not allowed" will be applied to the terminal device 100 to prevent photographing of the contents of books by a camera at the book store. Then, as will be the same in the respective embodiments to follow, the present embodiment requires no provision of a position detecting device which detects each position of numbers of the terminal devices 100, resulting in preventing an increase in the entire system costs.

Second Embodiment

Figure 6:
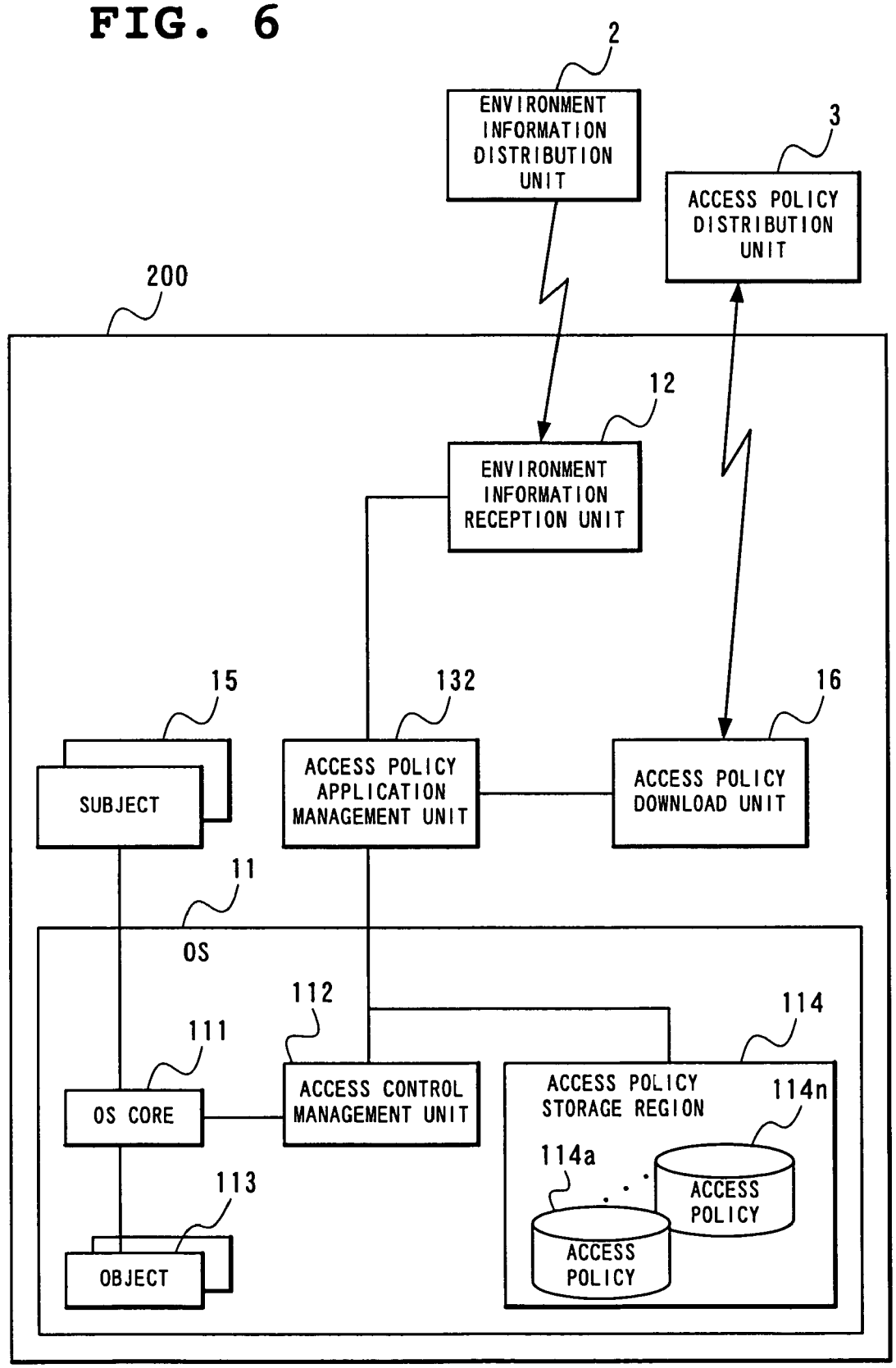
FIG. 6 is a block diagram showing a structure of an access control management system according to a second embodiment of the present invention.

Next, a second embodiment of the present invention will be described. FIG. 6 is a block diagram showing the second embodiment of the access control management system according to the present invention. As illustrated in FIG. 6, the access control management system according to the second embodiment includes a terminal device 200, the environment information distribution unit 2 and an access policy distribution unit 3.

The access policy distribution unit 3 holds various kinds of access policies and transmits a relevant access policy to the terminal device 200 according to a request from the terminal device 200. More specifically, the access policy distribution unit 3 is equivalent to an external data base which holds description of an access control method. The access policy distribution unit 3 can be realized as a server device having a data base which holds an access policy. In addition, the terminal device 200 transmits a request to the access policy distribution unit 3 through, for example, a portable telephone communication network or the Internet, as well as receiving an access policy from the access policy distribution unit 3.

In the present embodiment, an access policy application management unit 132 tries to specify an access policy adapted to a policy ID notified by the environment information distribution unit 2 from the access policy storage region 114. As a result, when there exists no relevant access policy, notify an access policy download unit 16 of the notified policy ID. Then, the access policy download unit 16 stores the access policy received from the access policy distribution unit 3 in the access policy storage region 114 and notifies the access control management unit 112 in the OS 11 of information which designates the access policy. When confirming that there already exists a relevant access policy in the access policy storage region 114, the access policy application management unit 132 notifies the access control management unit 112 in the OS 11 of information which designates the access policy.

Based on a request containing a policy ID from the access policy application management unit 132, the access policy download unit 16 provided in the terminal device 200 downloads a most appropriate access policy from the access policy distribution unit 3 to hand over the access policy to the access policy application management unit 132. In a case where a portable telephone having such a structure as illustrated in FIG. 3 is used as the terminal device 200, the access policy download unit 16 is realized by the transmission and reception unit 29 and the CPU 21 which outputs a request containing a policy ID to the transmission and reception unit 29, as well as operating based on a program which extracts an access policy from a signal received at the transmission and reception unit 29.

Structure and function of the respective components other than the access policy distribution unit 3, the access policy application management unit 132 and the access policy download unit 16 are the same as the structure and the function of each component in the first embodiment.

Figure 7:
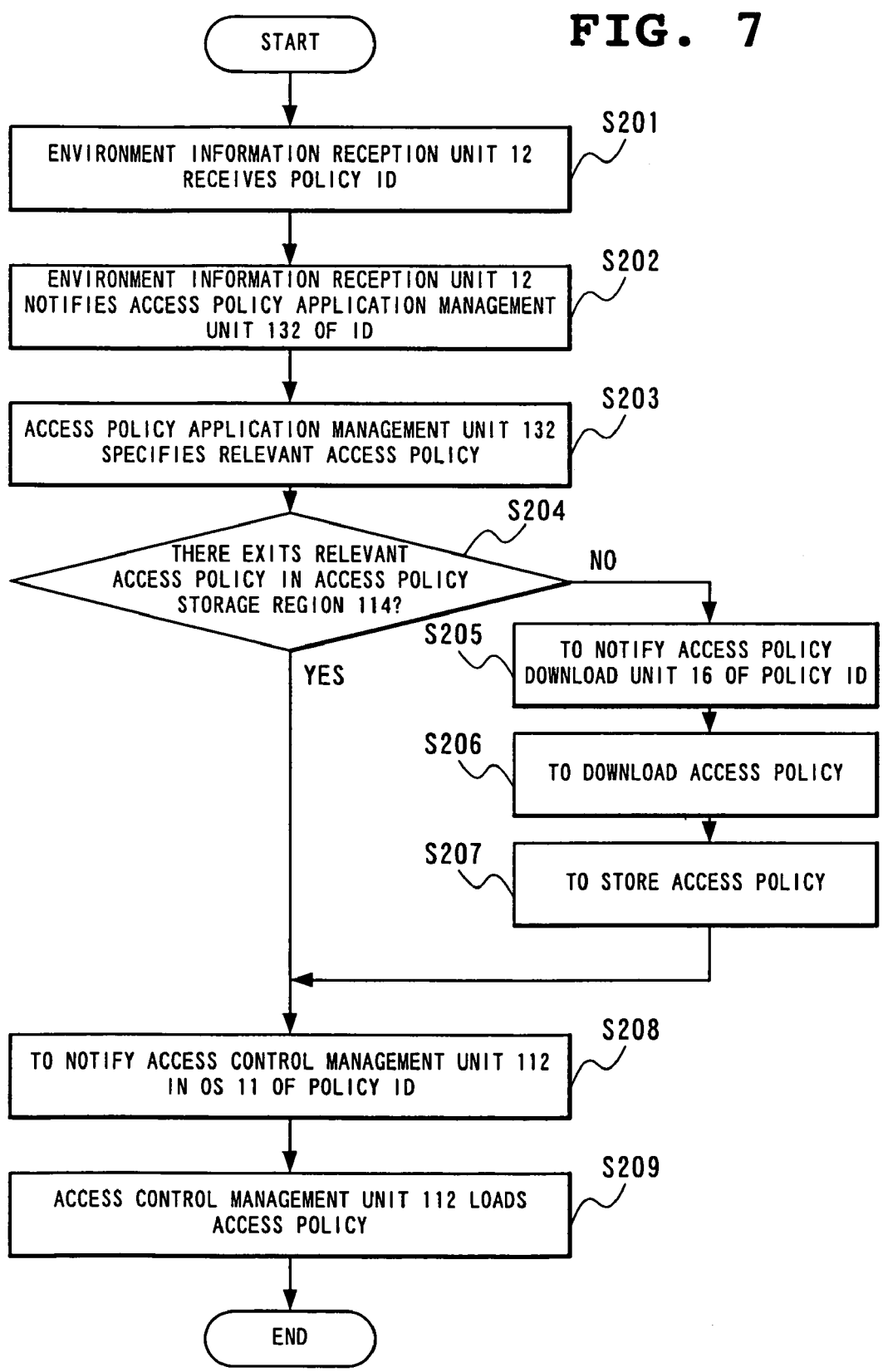
FIG. 7 is a flow chart showing operation of the second embodiment.

Next, operation of the second embodiment will be described with reference to the flow chart shown in FIG. 7. Assume here that used as the environment information distribution unit 2 is a transmitter which transmits a code of a policy ID as radio waves. First, at the terminal device 200, upon entering a region in which radio waves from the environment information distribution unit 2 can be received, the environment information reception unit 12 receives, from the environment information distribution unit 2, a policy ID according to an environment such as a position at which the environment information distribution unit 2 is disposed (Step S201). The environment information reception unit 12 notifies the access policy application management unit 132 of the received policy ID (Step S202). The access policy application management unit 132 tries to specify a relevant access policy from the access policy storage region 114 based on the notified policy ID (Step S203). When there exists no relevant access policy (Step S204), the access policy application management unit 132 notifies the access policy download unit 16 of a request for downloading an access policy together with the notified policy ID (Step S205).

The access policy download unit 16 transmits the policy ID to the access policy distribution unit 3 through the portable telephone communication network or the Internet based on the request from the access policy application management unit 132 to request distribution of an access policy of the policy ID. In response to the request, the access policy distribution unit 3 transmits the access policy to the access policy download unit 16 of the terminal device 200. In other words, the access policy download unit 16 downloads the access policy from the access policy distribution unit 3 (Step S206). Then, hand over the downloaded access policy to the access policy application management unit 132.

The access policy application management unit 132 stores the downloaded access policy in the access policy storage region 114 (Step S207). Then, the access policy application management unit 132 notifies the access control management unit 112 in the OS 11 of information which designates the access policy (Step S208). Then, the access control management unit 112 loads the designated access policy from the access policy storage region 114 (Step S209).

In addition, when the access policy of the policy ID notified by the environment information distribution unit 2 can be specified in the access policy storage region 114 (Step S204), the access policy application management unit 132 notifies the access control management unit 112 in the OS 11 of the information which designates the access policy (Step S208).

Operation of the subject 15 executed when accessing the object 113 in the OS 11 is the same as that in the first embodiment.

Because also in the present embodiment, the terminal device 200 is structured to select an access policy to be applied based on information notified by the environment information distribution unit 2, access control can be executed under an access policy most suitable for an environment in which the terminal device 200 is placed.

Furthermore, according to the present embodiment, the terminal device 200 is structured such that when an access policy to be applied which is notified by the environment information distribution unit 2 is not contained in the device, an access policy to be applied can be downloaded by using the access policy download unit 16. Therefore, this arrangement enables a new access policy other than access policies held by the terminal device 200 to be applied to the terminal device 200, whereby an access control management method can be executed which enables an application range to be further expanded.

Third Embodiment

Figure 8:
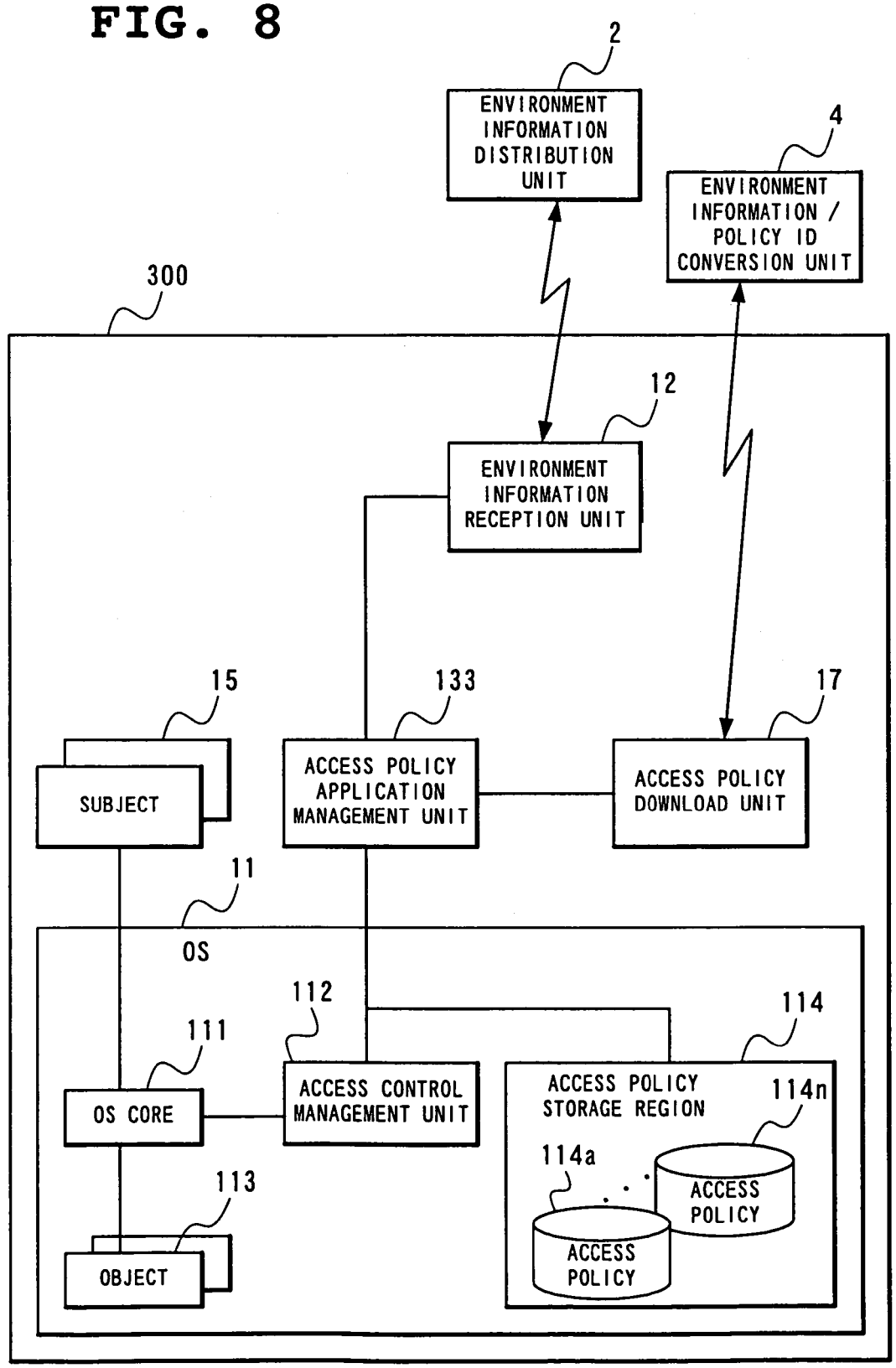
FIG. 8 is a block diagram showing a structure of an access control management system according to a third embodiment of the present invention.

Next, a third embodiment of the present invention will be described. FIG. 8 is a block diagram showing the third embodiment of the access control management system according to the present invention. As shown in FIG. 8, the access control management system according to the third embodiment includes a terminal device 300, the environment information distribution unit 2 and an environment information/policy ID conversion unit 4.

The environment information distribution unit 2 holds environment information. Position information created based on a signal transmitted by a GPS satellite as the environment information distribution unit 2 and ID information set to a transmitter as the environment information distribution unit 2 are among environment information. ID information set at the environment information distribution unit 2 is, for example, ID information which can unitarily specify a building.

In response to an inquiry request with environment information notified from the terminal device 300, the environment information/policy ID conversion unit 4 searches for a policy ID adapted to the environment information and returns the same to the terminal device 300. In other words, the environment information/policy ID conversion unit 4, which stores corresponding relationships between various kinds of environment information and policy IDs which specify access policies adapted to the information, is equivalent to a conversion device which provides correspondence between environment information and description of an access control method (access policy). The environment information/policy ID conversion unit 4 can be realized, for example, as a server device. In addition, the terminal device 300 transmits environment information to the environment information/policy ID conversion unit 4 through, for example, a portable telephone communication network or the Internet, as well as receiving a policy ID from the environment information/policy ID conversion unit 4.

Based on the environment information notified by the environment information distribution unit 2, an access policy application management unit 133 requests an environment information notification unit 17 to inquire of the environment information/policy ID conversion unit 4 about a policy ID coincident with the environment information.

The environment information notification unit 17 provided at the terminal device 300 notifies the environment information/policy ID conversion unit 4 of an inquiry request from the access policy application management unit 133.

In a case where the environment information distribution unit 2 is a transmitter which transmits a code of ID information by radio waves or an infrared ray, used as the terminal device 300 is, for example, a portable telephone having such a structure as shown in FIG. 3. In a case where the environment information distribution unit 2 is a GPS satellite, used as the terminal device 300 is, for example, a portable telephone having such a structure as shown in FIG. 4.

On the other hand, when used as the terminal device 300 is a portable telephone having such a structure as shown in FIG. 3 or 4, the environment information notification unit 17 is realized by the transmission and reception unit 29 and the CPU 21 which outputs an inquiry request containing environment information to the transmission and reception unit 29, as well as operating based on a program for extracting a policy ID from a signal received at the transmission and reception unit 29.

The environment information reception unit 12 notifies information (ID information as environment information in this embodiment) received from the environment information distribution unit 2 to the access policy application management unit 133. Based on the notified environment information, the access policy application management unit 133 inquires of the environment information/policy ID conversion unit 4 through the environment information notification unit 17 to obtain a policy ID coincident with the environment information from the environment information/policy ID conversion unit 4. Then, specify a relevant access policy from the access policy storage region 114 to notify the access control management unit 112 in the OS 11 of information which designates the access policy.

Structure and function of other components than the environment information/policy ID conversion unit 4, the access policy application management unit 133 and the environment information notification unit 17 are the same as the structure and the function of each component in the first embodiment. As to the environment information distribution unit 2, while it transmits a policy ID in the first embodiment, it transmits ID information as environment information in the present embodiment.

Figure 9:
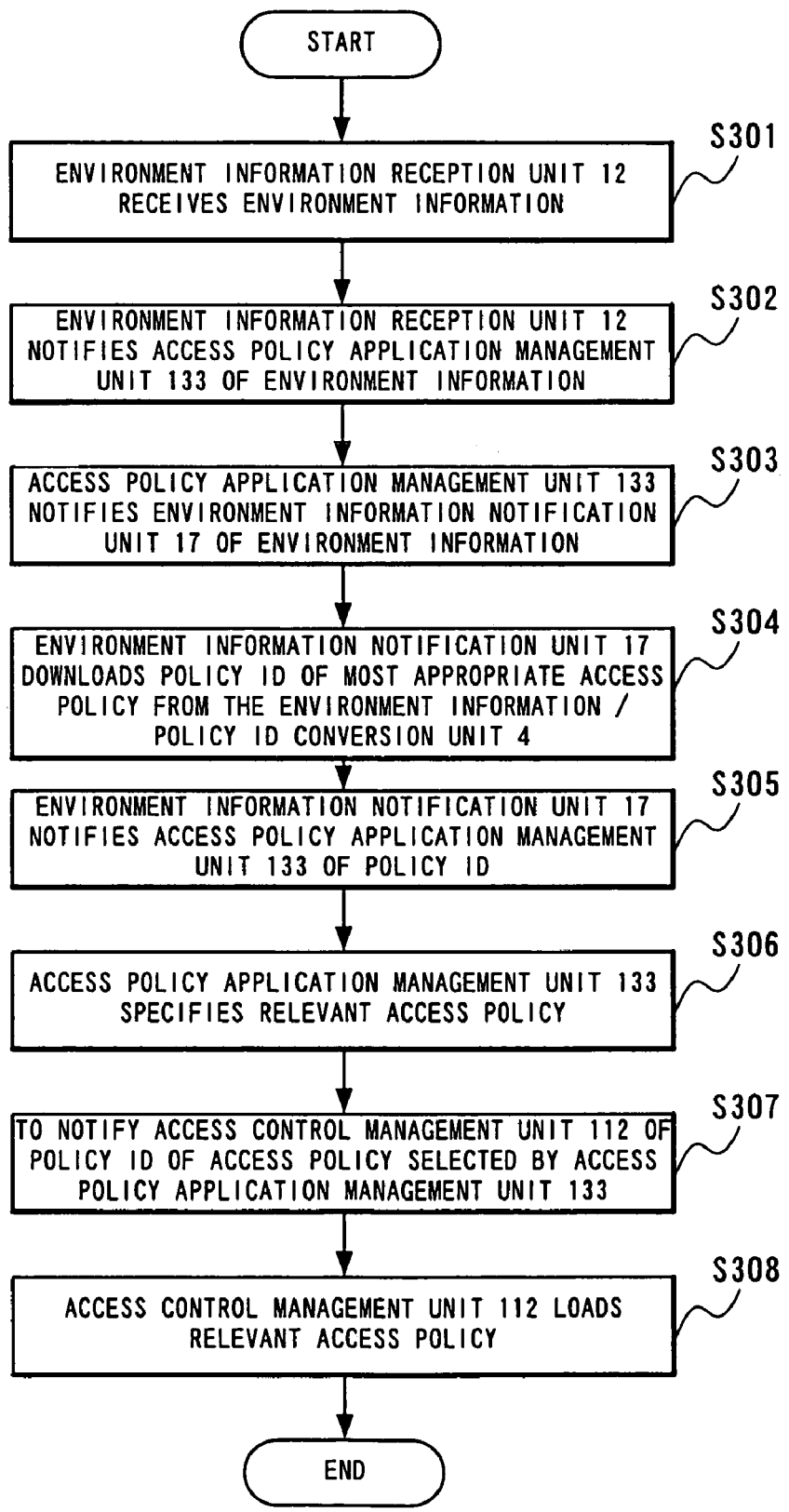
FIG. 9 is a flow chart showing operation of the third embodiment.

Next, description will be made of operation of the third embodiment with reference to the flow chart of FIG. 9. Assume a case where as the environment information distribution unit 2, a transmitter is used which transmits an ID information code as radio waves. First, at the terminal device 300, when entering a region in which radio waves from the environment information distribution unit 2 can be received, the environment information reception unit 12 receives environment information from the environment information distribution unit 2 (Step S301). The environment information reception unit 12 notifies the access policy application management unit 133 of the received environment information (Step S302). The access policy application management unit 133 notifies the environment information notification unit 17 of an inquiry request involving the notified environment information (Step S303). The environment information notification unit 17 transmits the inquiry request from the access policy application management unit 13 to the environment information/policy ID conversion unit 4 through the portable telephone communication network or the Internet. The environment information/policy ID conversion unit 4 selects a policy ID most appropriate for the contents of the environment information in response to the inquiry request to transmit the selected policy ID to the terminal device 300.

With policy IDs adapted to environment information stored in the environment information/policy ID conversion unit 4, when the environment information indicates "concert hall", the environment information/policy ID conversion unit 4 selects a policy ID containing description which stops a dialing and incoming call receiving function of a portable telephone.

Thus, the environment information notification unit 17 downloads a policy ID (Step S304) and notifies the access policy application management unit 133 of the ID (Step S305). Based on the notified policy ID, the access policy application management unit 133 specifies a relevant access policy from the access policy storage region 114 (Step S306) and notifies the access control management unit 112 in the OS 11 of information designating the access policy (Step S307). Then, the access control management unit 112 loads the designated access policy from the access policy storage region 114 (Step S308).

Operation conducted by a subject 15 at the time of accessing the object 113 in the OS 11 is the same as that in the first embodiment.

Also in this embodiment, because the terminal device 300 is structured to select an access policy to be applied based on information notified by the environment information distribution unit 2, access control can be executed under an access policy most suitable for an environment in which the terminal device 300 is placed.

Furthermore, the device according to the present embodiment is structured such that a policy ID is specified by the environment information/policy ID conversion unit 4 based on general-purpose environment information (position information based on a signal from a GPS satellite, ID information contained in an RFID tag, etc.) Accordingly, the environment information distribution unit 2 needs not have information (policy ID) inherent to an access policy. In other words, a system for more general purposes can be established.

FIG. 10 is an explanatory diagram showing one example of a table indicative of corresponding relationships between environment information and policy IDs held by the environment information/policy ID conversion unit 4. In the example shown in FIG. 10, environment information is ID information unitarily assigned to each building or the like. In this case, at the table of corresponding relationships, each ID information and policy ID are set to correspond to each other. Upon receiving a request for specific information which specifies an access policy adapted to environment information (ID information in this example) from the terminal device 300, the environment information/policy ID conversion unit 4 as a conversion device transmits a policy ID corresponding to ID information set at the table as specific information to the terminal device 300. In other words, the environment information/policy ID conversion unit 4 converts environment information into a policy ID and transmits the policy ID as conversion information (i.e. specific information) to the terminal device 300. "Kind" in the table is not an indispensable setting item. In addition, as long as each ID information and policy ID are set to correspond to each other in the table, the table may have a structure different from that of the example shown in FIG. 10. Unit for changing the contents of the table shown in FIG. 10 may be provided. Possible is, for example, to provide a management server which updates contents of the table held by the environment information/policy ID conversion unit 4 and provide the environment information/policy ID conversion unit 4 with a reception function of receiving update information (updated contents of the table) from the management server and an updating function of rewriting the contents of the table or provide the environment information/policy ID conversion unit 4 with a reception function of receiving update information applied through the operation unit 34 of the terminal device 300 and transmitted from the terminal device 300 and an updating function of rewriting the contents of the table.

While in the above-described example, the environment information distribution unit 2 is a transmitter which transmits a code of ID information by radio waves or an infrared ray, in a case where the environment information distribution unit 2 is a GPS satellite, the GPS circuit 32 which realizes the environment information reception unit 12 (see FIG. 4) calculates position information indicative of an existing position of the terminal device 300 by using a signal received from a plurality of GPS satellites. Then, the position information is transmitted to the environment information/policy ID conversion unit 4 as environment information. The environment information distribution unit 2 receives a signal from the GPS satellite to calculate position information periodically, for example, every one minute counted by the timer 24.

FIG. 11 is a diagram showing another example of a table of corresponding relationship between environment information and policy IDs. In the example shown in FIG. 11, environment information is position information. In the corresponding relationship table, significant position information and a policy ID are set to correspond to each other. "Significant position information" is information indicative of a position at which access control should be adapted such as a position at which a concert hall or the like exists. "Kind" in the table is not an indispensable setting item. It is also possible to provide a unit for changing contents of the table shown in FIG. 11. Possible is, for example, to provide a management server which updates contents of the table held by the environment information/policy ID conversion unit 4 and provide the environment information/policy ID conversion unit 4 with a reception function of receiving update information (updated contents of the table) from the management server and an updating function of rewriting the contents of the table or provide the environment information/policy ID conversion unit 4 with a reception function of receiving update information applied through the operation unit 34 of the terminal device 300 and transmitted from the terminal device 300 and an updating function of rewriting the contents of the table.

Moreover, with a map data base included in the environment information/policy ID conversion unit 4, the unit may search the map data base based on position information and when a position indicated by the position information is "concert hall", select a policy ID containing such description as to stop a dialing and incoming call receiving function of a portable telephone.

Fourth Embodiment

Figure 12:
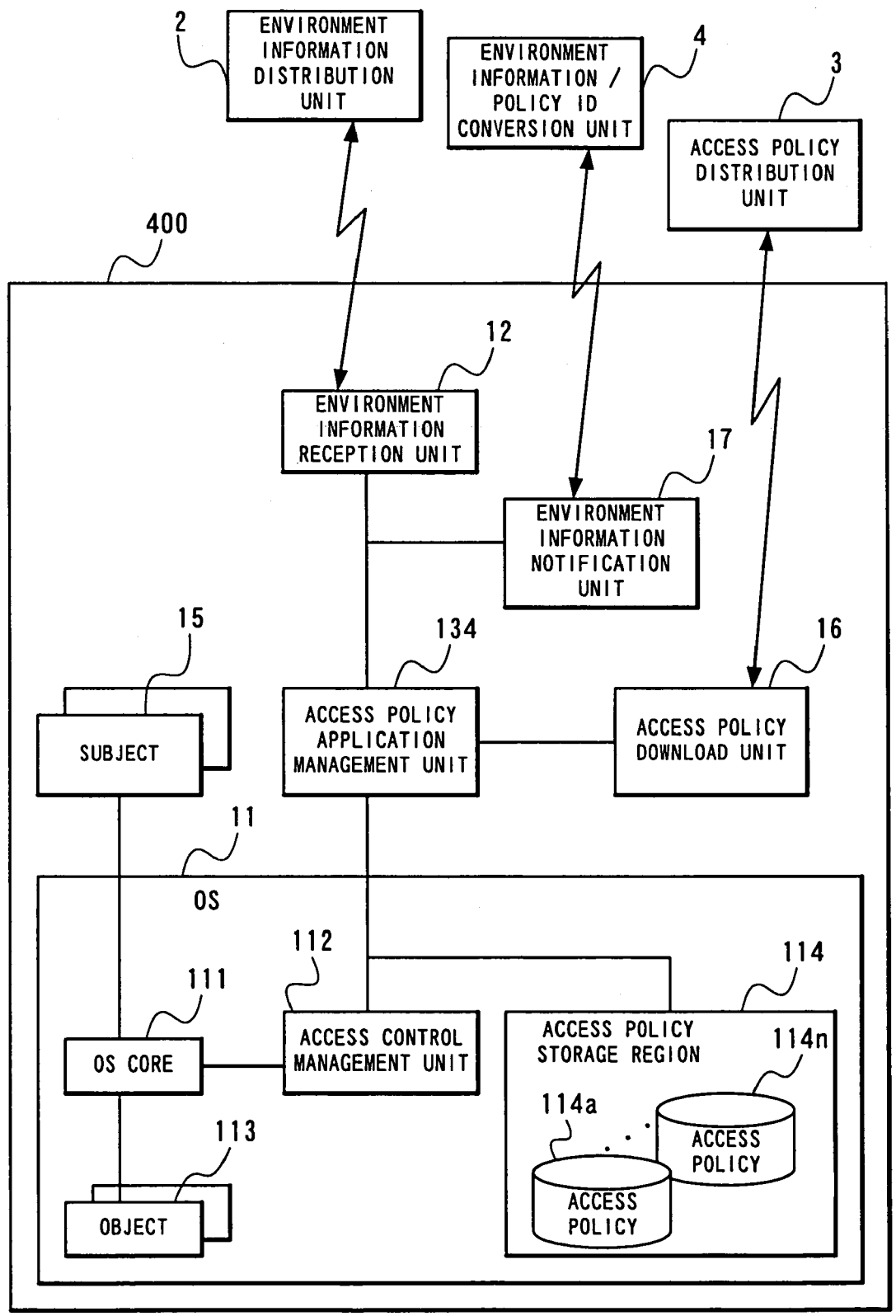
FIG. 12 is a block diagram showing a structure of an access control management system according to a fourth embodiment of the present invention.

Next, a fourth embodiment of the present invention will be described with reference to the drawings. FIG. 12 is a block diagram showing the fourth embodiment of the access control management system according to the present invention. As illustrated in FIG. 12, the access control management system of the fourth embodiment includes a terminal device 400, an environment information distribution unit 2, an access policy distribution unit 3 and an environment information/policy ID conversion unit 4.

In contrast with the access control management system according to the third embodiment shown in FIG. 8, in the present embodiment, the access policy distribution unit 3 is added which holds various kinds of access policies and transmits a relevant access policy to the terminal device 400 in response to a request from the terminal device 400.

In addition, the terminal device 400 is provided with the access policy download unit 16 which downloads a most appropriate access policy from the access policy distribution unit 3 based on a request containing an ID from an access policy application management unit 134 and notifies the access policy application management unit 132 of information designating the access policy.

In the present embodiment, at the terminal device 400, based on environment information notified from the environment information distribution unit 2, the access policy application management unit 134 asks the environment information notification unit 17 to inquire of the environment information/policy ID conversion unit 4 about a policy ID coincident with the environment information. The access policy application management unit 134 furthermore tries to specify an access policy from the access policy storage region 114 based on a policy ID notified by the environment information distribution unit 2. As a result, when there exists no relevant access policy, the access policy application management unit 134 notifies the access policy download unit 16 of the notified policy ID. Then, the access policy download unit 16 stores the access policy received from the access policy distribution unit 3 in the access policy storage region 114 and notifies the access control management unit 112 in the OS 11 of information designating the access policy. When confirming that the relevant access policy already exists in the access policy storage region 114, the access policy application management unit 134 notifies the access control management unit 112 in the OS 11 of the information designating the access policy.

Structure and function of each component other than the access policy distribution unit 3, the access policy download unit 16 and the access policy application management unit 134 are the same as the structure and the function of each component in the third embodiment. In addition, the access policy distribution unit 3 and the access policy download unit 16 have the same structures as those used in the second embodiment.

Figure 13:
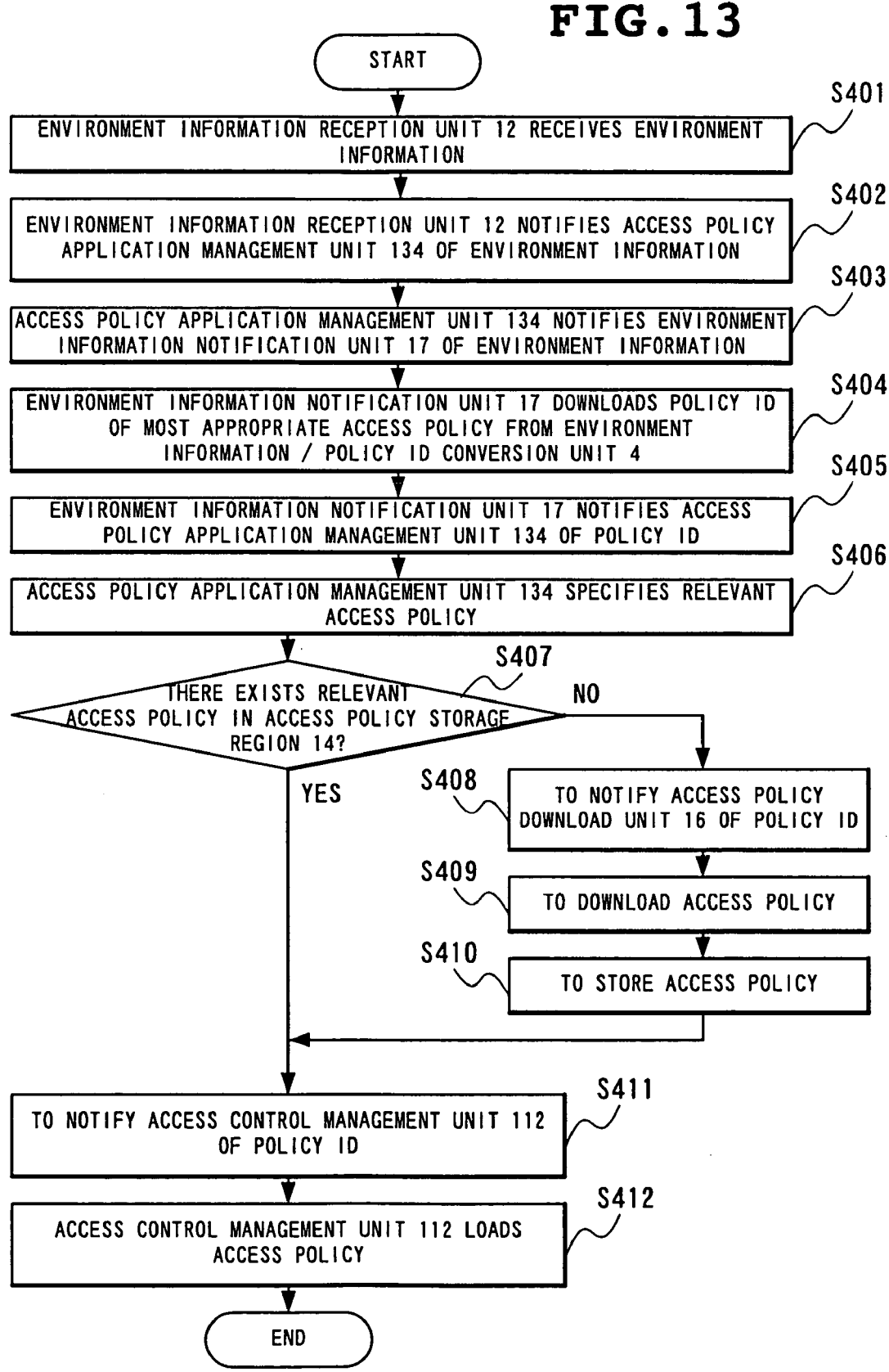
FIG. 13 is a flow chart showing operation of the fourth embodiment.

Next, operation of the fourth embodiment will be described with reference to the flow chart of FIG. 13. In the terminal device 400, first, the environment information reception unit 12 receives environment information from the environment information distribution unit 2 similarly to the case of the third embodiment (Step S401). The environment information reception unit 12 notifies the access policy application management unit 134 of the received environment information (Step S402). The access policy application management unit 134 notifies the environment information notification unit 17 of an inquiry request involving the notified environment information (Step S403). The environment information notification unit 17 transmits an inquiry request from the access policy application management unit 13 to the environment information/policy ID conversion unit 4. The environment information/policy ID conversion unit 4 selects a policy ID most appropriate for the contents of the environment information in response to the inquiry request to transmit the selected policy ID to the terminal device 400.

Thus, the environment information notification unit 17 downloads a policy ID (Step S404) and notifies the access policy application management unit 134 of the ID (Step S405). The access policy application management unit 134 tries to specify a relevant access policy from the access policy storage region 114 based on the notified policy ID (Step S406). When there exists no relevant access policy (step S407), the access policy application management unit 134 notifies the access policy download unit 16 of a request for downloading an access policy together with the notified policy ID (Step S408).

Based on the request from the access policy application management unit 134, the access policy download unit 16 transmits the policy ID to the access policy distribution unit 3 to request distribution of the access policy of the policy ID. The access policy distribution unit 3 transmits the access policy to the access policy download unit 16 of the terminal device 400 in response to the request. In other words, the access policy download unit 16 downloads the access policy from the access policy distribution unit 3 (Step S409).

The access policy application management unit 134 stores the access policy downloaded by the access policy download unit 16 in the access policy storage region 114 (Step S410). Then, the access policy application management unit 134 notifies the access control management unit 112 in the OS 11 of information designating the access policy (Step S411). Then, the access control management unit 112 loads the designated access policy from the access policy storage region 114 (Step S412).

When the access policy of the policy ID notified by the environment information distribution unit 2 can be specified in the access policy storage region 114 (Step S407), the access policy application management unit 134 notifies the access control management unit 112 in the OS 11 of the access policy (Step S411).

Operation of the subject 15 conducted when accessing the object 113 in the OS11 is the same as that in the third embodiment.

Also in this embodiment, because the terminal device 400 is structured to select an access policy to be applied based on information notified by the environment information distribution unit 2, access control can be executed under an access policy most suitable for an environment in which the terminal device 400 is located.

In the present embodiment, the terminal device 400 is further structured to download an access policy to be applied by using the access policy download unit 16 when no access policy adapted to environment information based on information notified from the environment information distribution unit 2 is included in the device. Accordingly, it is possible to execute an access control management method which enables an application range to be further expanded.

Also in this embodiment, a GPS satellite can be desirably applied as the environment information distribution unit 2. As a result, similarly to the case of the third embodiment, a policy ID can be specified by the environment information/policy ID conversion unit 4 based on general-purpose environment information (position information based on a signal received from a GPS satellite, ID information from a transmitter disposed at an entrance of a building, etc.) The environment information distribution unit 2 accordingly needs not have information inherent to an access policy. In other words, a system for more general purposes can be established.

Fifth Embodiment

Figure 14:
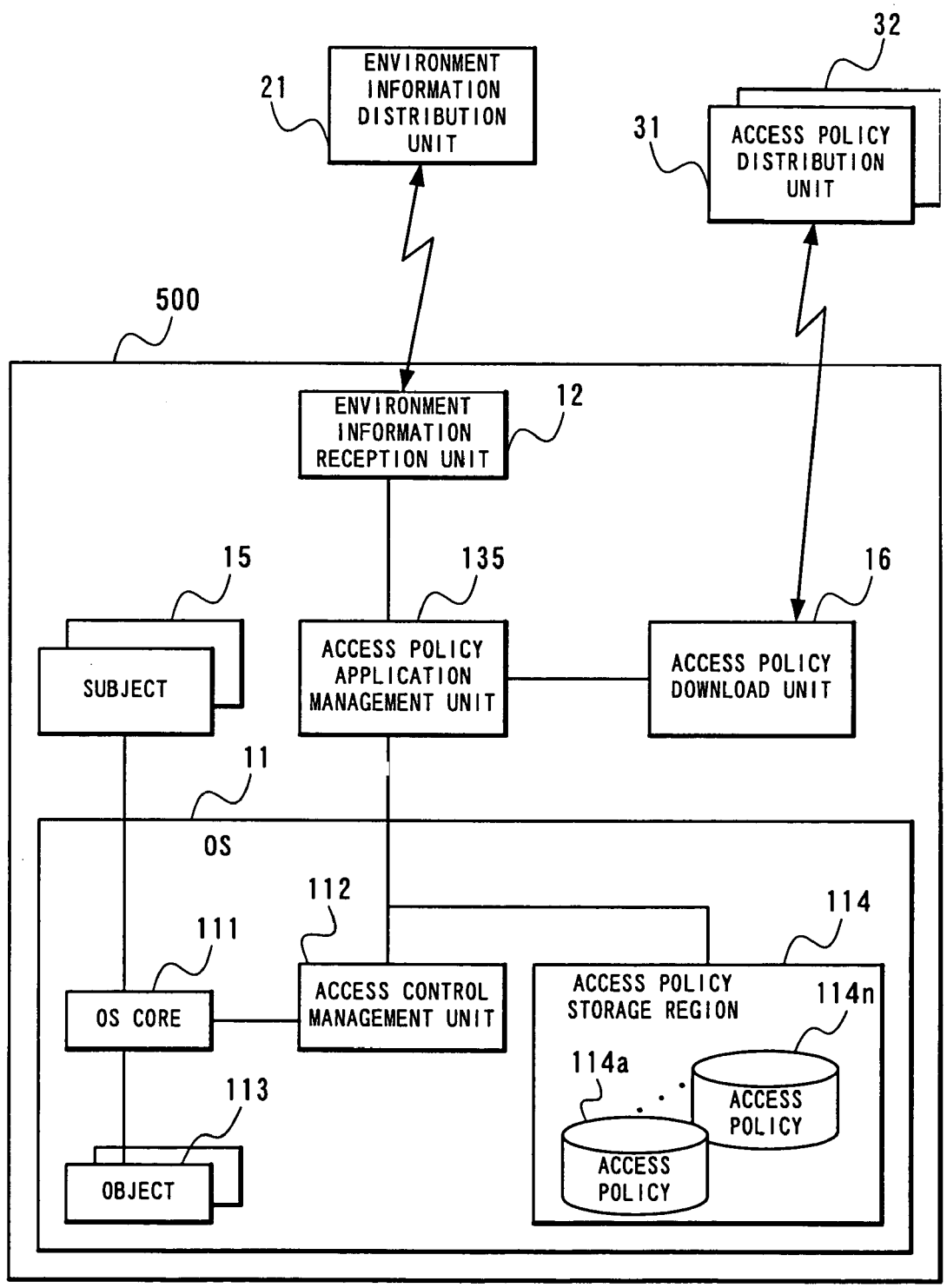
FIG. 14 is a block diagram showing a structure of an access control management system according to a fifth embodiment of the present invention.

Next, a fifth embodiment of the present invention will be described with reference to the drawings. FIG. 14 is a block diagram showing the fifth embodiment of the access control management system according to the present invention. As illustrated in FIG. 14, the access control management system of the fifth embodiment includes a terminal device 500, the environment information distribution unit 21 and a plurality of access policy distribution units 31 and 32. Although shown in FIG. 14 are the two access policy distribution units 31 and 32, there is no limit to the number of access policy distribution units.

In contrast with the access control management system of the second embodiment shown in FIG. 6, the present embodiment differs in that there exist the plurality of the access policy distribution units 31 and 32. The access policy distribution units 31 and 32 are not disposed at the same place but at different places. Information held by the environment information distribution unit 21 is different from information held by the environment information distribution unit 2 in the second embodiment. In the present embodiment, the environment information distribution unit 21 holds a policy ID and an ID of an access policy distribution unit.

In the terminal device 500, an access policy application management unit 135 identifies an access policy distribution unit as a communication partner based on an ID of an access policy distribution unit transmitted from the environment information distribution unit 21. Then, the access policy application management unit 135 notifies a policy ID and information indicative of an identified access policy distribution unit to the access policy download unit 16. Furthermore, the access policy application management unit 135 stores a downloaded access policy in the access policy storage region 114 and notifies the access control management unit 112 in the OS 11 of information designating the access policy.

The present embodiment is useful when a transmitter which is disposed at an entrance of a building or the like to transmit a policy ID code as radio waves or an infrared ray is used as the environment information distribution unit 21. Then, the present embodiment is premised on that one access policy distribution unit is disposed in proximity to the environment information distribution unit 21.

Structure and function of each component other than the environment information distribution unit 21, the plurality of access policy distribution units 31 and 32 and the access policy application management unit 135 are the same as the structure and the function of each component in the second embodiment. Only a difference is that in the present embodiment, the access policy download unit 16 has a function of receiving designation of an access policy to download an access policy from a designated access policy distribution unit.

Figure 15:
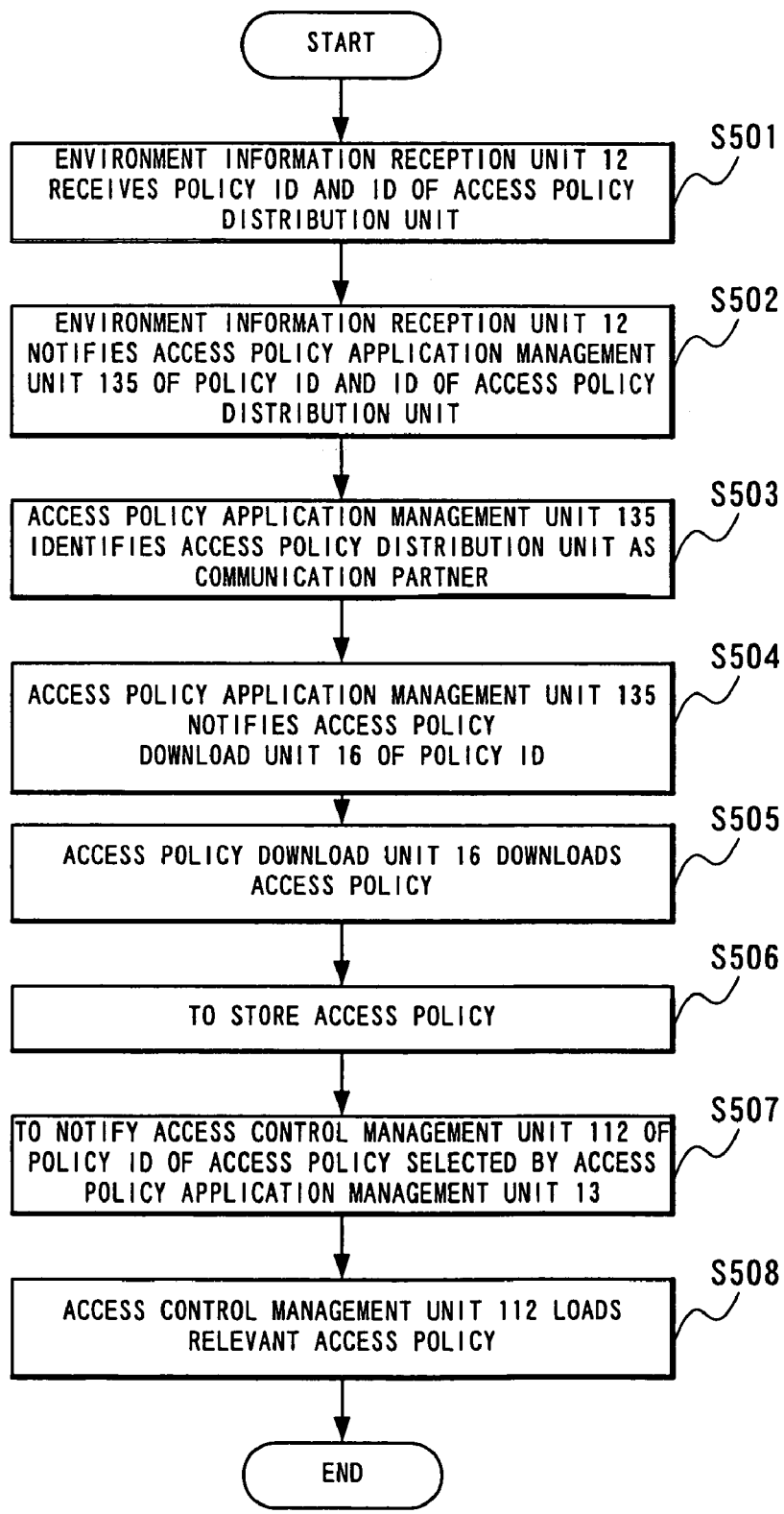
FIG. 15 is a flow chart showing operation of the fifth embodiment.

Next, operation of the fifth embodiment will be described with reference to the flow chart shown in FIG. 15. First, at the terminal device 500, the environment information reception unit 12 receives a policy ID according to an environment such as a position at which the environment information distribution unit 21 is disposed and an ID of an access policy distribution unit from the environment information distribution unit 21 (Step S501). The environment information reception unit 12 notifies the access policy application management unit 135 of each of the received IDs (Step S502). The access policy application management unit 135 identifies one of access policy distribution units as a communication partner based on the notified ID of the access policy distribution unit (Step S503).

Based on the notified policy ID, the access policy application management unit 135 may try to specify a relevant access policy from the access policy storage region 114 and when there exists a relevant access policy in the access policy storage region 114, the following step may be omitted.

Next, the access policy application management unit 135 notifies the access policy download unit 16 of the notified policy ID together with information indicative of the identified access policy distribution unit (Step S504). Based on a request from the access policy application management unit 132, the access policy download unit 16 transmits the policy ID to the designated access policy distribution unit to request distribution of an access policy of the ID. In response to the request, the access policy distribution unit transmits the access policy to the access policy download unit 16 of the terminal device 500. More specifically, the access policy download unit 16 downloads the access policy from the access policy distribution unit 3 designated by the access policy application management unit 135 (Step S505).

The access policy application management unit 135 stores the access policy downloaded by the access policy download unit 16 in the access policy storage region 114 (Step S506). Then, the access policy application management unit 135 notifies the access control management unit 112 in the OS 11 of information designating the access policy (Step S507). Then, the access control management unit 112 loads the designated access policy from the access policy storage region 114 (Step S508).

Operation conducted by the subject 15 when accessing the object 113 in the OS 11 is the same as that in the first embodiment.

Also in the present embodiment, because the terminal device 500 is structured to select an access policy to be applied based on information notified from the environment information distribution unit 2, access control can be executed under an access policy most appropriate for an environment in which the terminal device 500 is placed.

In addition, similarly to the second embodiment, the terminal device 500 is structured to download an access policy to be applied by using the access policy download unit 16 when an access policy to be applied which is notified by the environment information distribution unit 2 is not included in the device. Therefore, it is possible to execute an access control management method which enables an application range to be further expanded.

Furthermore, the environment information distribution unit 2 is structured to include an ID of an access policy distribution unit as well other than a policy ID. Therefore, the number of the access policy distribution units 3 needs not to be limited to one and they can be arranged dispersedly. Accordingly, dispersed arrangement of the access policy distribution units 31 and 32 is possible such as disposing an access policy distribution unit which distributes an access policy inhibiting telephone call by the terminal device 500 at a concert hall and an access policy distribution unit which distributes an access policy inhibiting camera function at a book store.

Moreover, with one access policy distribution unit disposed at a predetermined region such as a shopping arcade, the terminal device 500 may keep the respective access policies corresponding to book stores and the like existing at the respective places which are to be subjected to access control in the region in the lump. In this case, when a radio LAN is laid at the predetermined region, the terminal device 500 can be structured to receive distribution of an access policy from the access policy distribution unit through the radio LAN.

In a case where one access policy distribution unit 3 which keeps numbers of access policies is provided, the terminal device 500 is in general required to download an access policy from the access policy distribution unit 3 through a charged portable telephone communication network. In the present embodiment, however, an access policy can be downloaded by short-distance communication (e.g. Bluetooth or radio LAN) involving no charge.

Accordingly, while in the second embodiment, the access policy download unit 16 is realized by the transmission and reception unit 29 (circuit for communicating with a base station) in a portable telephone having such a structure as shown in FIG. 3, in the present embodiment, the access policy download unit 16 is realized by the communication circuit 31 in the portable telephone having such a structure as illustrated in FIG. 3. In the present embodiment, the communication circuit 31 preferably includes a circuit having a radio LAN communication function, or includes a Bluetooth circuit or an infrared communication circuit and a circuit having a radio LAN communication function.

Sixth Embodiment

Figure 16:
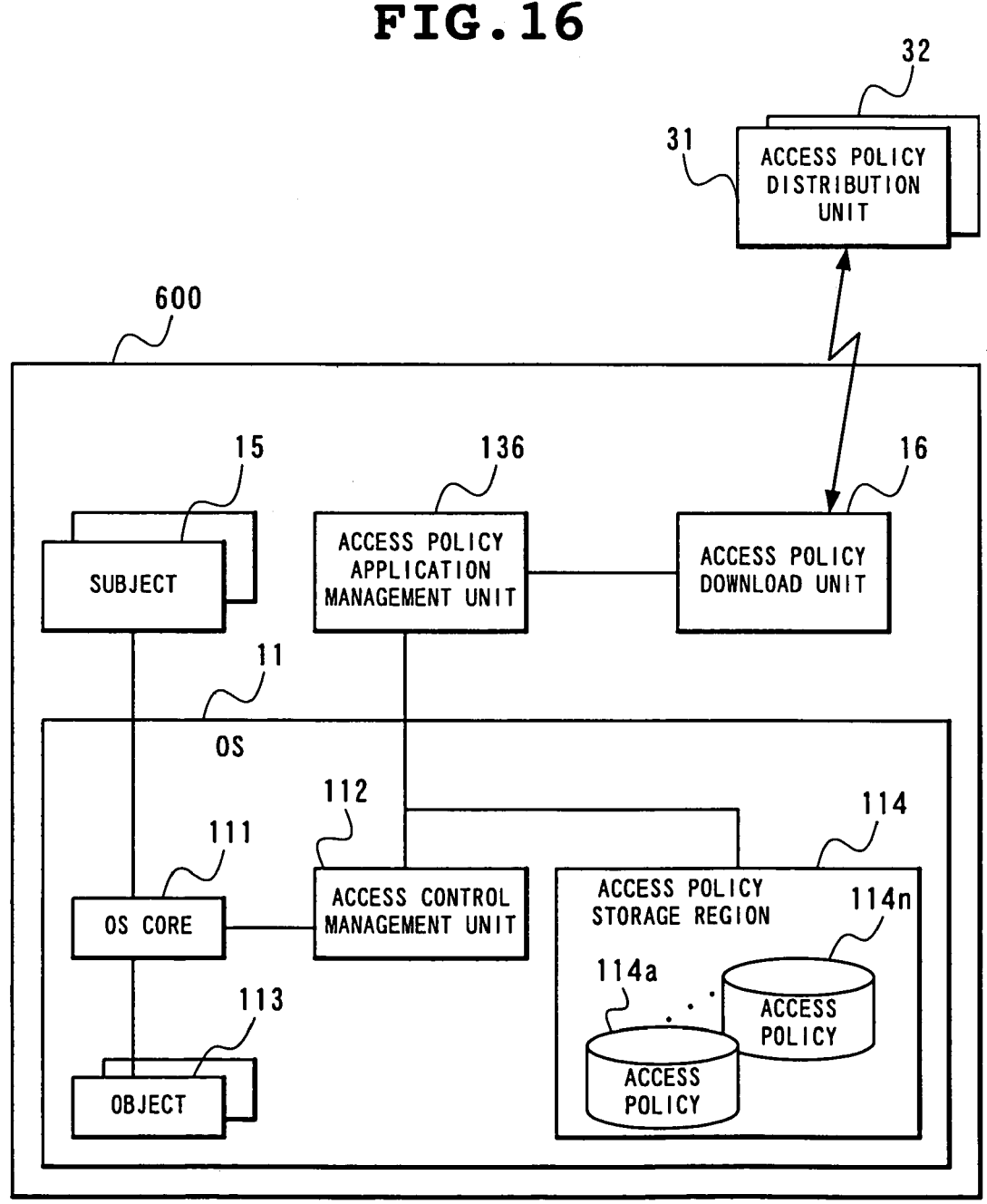
FIG. 16 is a block diagram showing a structure of an access control management system according to a sixth embodiment of the present invention.

Next, a sixth embodiment of the present invention will be described with reference to the drawings. FIG. 16 is a block diagram showing the sixth embodiment of the access control management system according to the present invention. As illustrated in FIG. 16, the access control management system of the sixth embodiment includes a terminal device 600, and at least one access policy distribution unit 31, 32. Although shown in FIG. 16 are the two access policy distribution units 31 and 32, there is no limit to the number of access policy distribution units.

The access policy distribution units 31 and 32 are located at various geographical regions. Then, to the terminal device 600 entering the region, distribute an access policy. The access policy download unit 16 downloads an access policy from any of the access policy distribution units 31 and 32 and notifies an access policy application management unit 136 of the downloaded access policy.

The access policy application management unit 136 stores the access policy downloaded by the access policy download unit 16 in the access policy storage region 114 and notifies the access management control unit 112 in the OS 11 of information designating the access policy.

Structure and function of the subject 15, the access policy storage region 114 and the OS 11 are the same as the structure and the function of each of the above-described embodiments.

Figure 17:
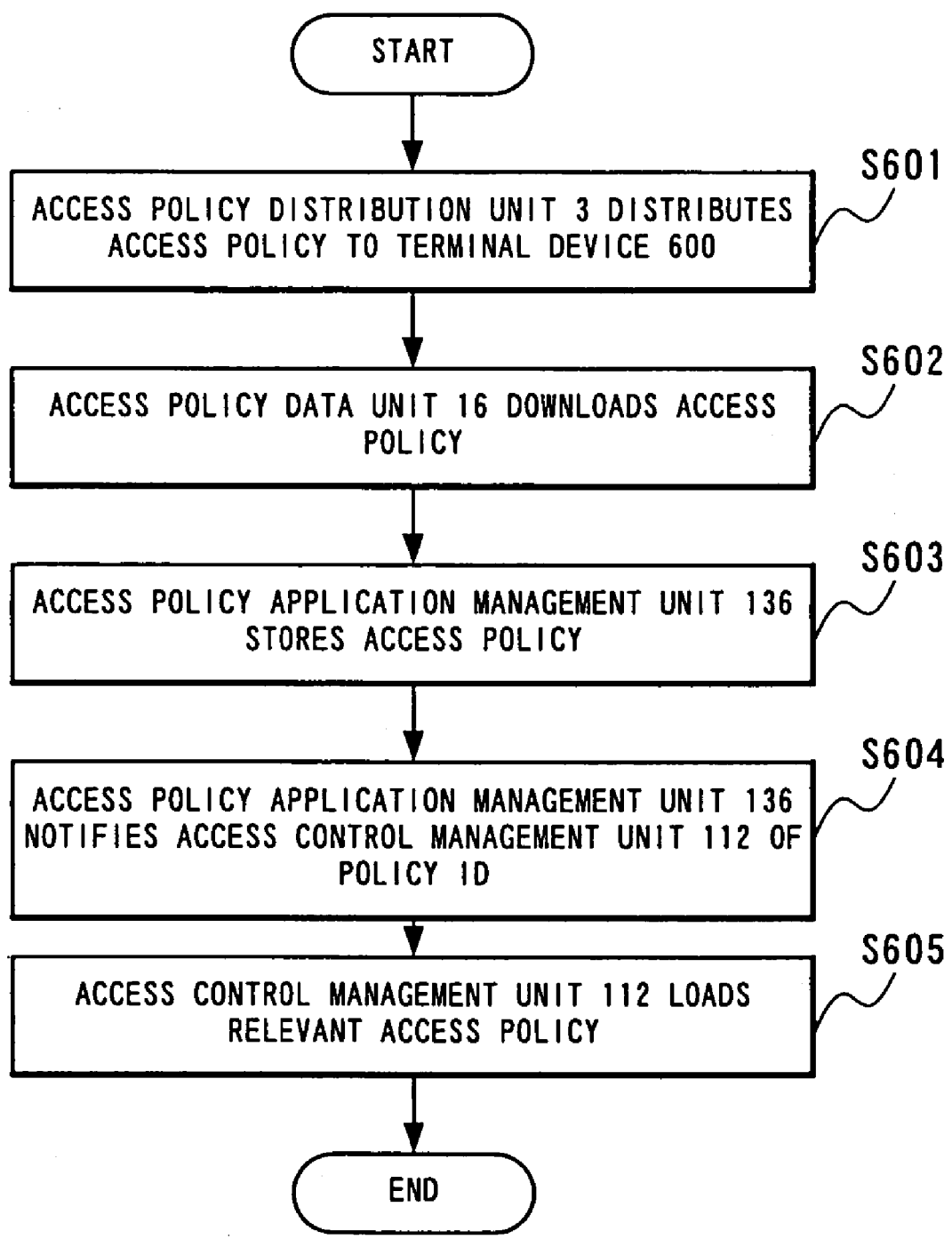
FIG. 17 is a flow chart showing operation of the sixth embodiment.

Next, operation of the sixth embodiment will be described with reference to the flow chart shown in FIG. 17. The access policy distribution units 31 and 32 transmit an access policy to the terminal device 600 which enters its managed geographical region (Step S601).

More specifically, at the terminal device 600, the access policy download unit 16 receives (downloads) an access policy from any of the access policy distribution units 31 and 32 (Step S602). The access policy application management unit 136 stores the downloaded access policy in the access policy storage region 114 (Step S603). Then, the access policy application management unit 136 notifies the access control management unit 112 in the OS 11 of information designating the access policy (Step S604). The access control management unit 112 loads the designated access policy from the access policy storage region 114 (Step S605).

Operation conducted by the subject 15 when accessing the object 113 in the OS 11 is the same as that in each of the above-described embodiments.

In the present embodiment, the terminal device 600 is structured to download an appropriate access policy from the access policy distribution units 31 and 32 according to a geographical region to which the terminal device 600 belongs. As a result, it is possible to execute access control under an access policy most suitable for an environment in which the terminal device 600 is located.

In addition, the terminal device 600 is structured to download an access policy to be applied by using the access policy download unit 16. Accordingly, even when an access policy to be applied is not included in the device, it is possible to execute access control under an access policy most suitable for an environment in which the terminal device 600 is placed.

Furthermore, the terminal device 600 needs to be internally provided with neither the environment information reception unit 12 nor the environment information notification unit 17 and neither the environment information distribution unit 2 nor the environment information/policy ID conversion unit 4, so that an access control dynamically changing method can be realized with ease.

Similarly to the case of the fifth embodiment, in the present embodiment, the access policy download unit 16 is realized by the communication circuit 31 in a portable telephone having such a structure as shown in FIG. 3. In addition, the communication circuit 31 preferably includes a circuit having a radio LAN communication function or includes a Bluetooth circuit or an infrared ray communication circuit and a circuit having a radio LAN communication function.

As described in the foregoing, each of the above-described embodiments enables a camera photographing function of a terminal device to be invalidated at a book store, for example. With the environment information distribution unit or the access policy distribution unit disposed at an entrance of a book store, transmit a policy ID or an access policy itself containing the contents operation to access a camera photographing function of a terminal device is not allowed from the unit. Then, the environment information reception unit of the terminal device receives the information to first search the terminal device for an access policy coincident with the information or receive the same from the access policy distribution unit, thereby loading a relevant access policy into the access control management unit in the OS. This arrangement makes an access policy that "operation to access a camera photographing function of a terminal device is not allowed" be applied to the terminal device to prevent photographing of the contents of a book in a book store by a camera.

Although the above-described respective embodiments have been described mainly with respect to a portable telephone as a terminal device, a terminal device to which the present invention is applied is not limited to a portable telephone. The present invention is applicable not only to a terminal device which conducts radio communication with an environment information distribution unit, an access policy distribution unit or the like but also to wired communication conducted between these units.

Figure 18:
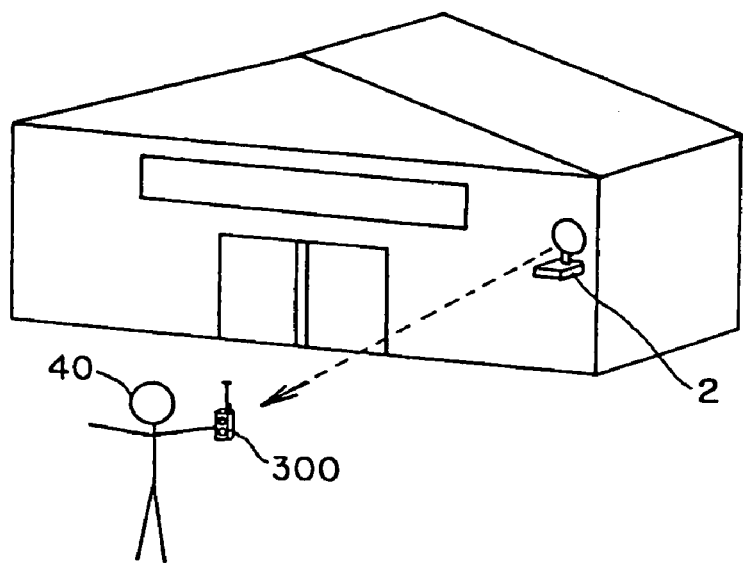
FIG. 18 is an explanatory diagram showing an example of application of an access control management method according to the present invention.

Next, a preferred application example of the present invention will be described. Here, description will be made of a case where the third embodiment shown in FIG. 8 is used. As illustrated in FIG. 18, at an entrance of a book store, the environment information distribution unit 2 is disposed which stores ID information assigned to the book store, as well as transmitting the ID information as radio waves. As a user 40 of a portable telephone as the terminal device 300 nears the book store, the environment information reception unit 12 at the terminal device 300 receives ID information.

Assume here that the portable telephone has such a structure as illustrated in FIG. 3. Also assume that the environment information/policy ID conversion unit 4 is realized by a server device accessible through the Internet. In the portable telephone, ID information is received by the communication circuit 31 and the received ID information is transmitted to the CPU 21. The CPU 21 reads identification information such as URL of the server device stored in a flush memory and instructs the transmission and reception unit 29 to transmit the ID information to a server device specified by the identification information such as its URL through a portable telephone communication network and the Internet, as well as receiving a policy ID from the server device.

When the transmission and reception unit 29 conducts communication according to the instruction to receive a policy ID from the server device, the policy ID is transmitted to the CPU 21. The CPU 21 loads an access policy specified by the policy ID from the ROM 22. Here, assume that the access policy includes a policy that camera photographing is inhibited.

Figure 19:
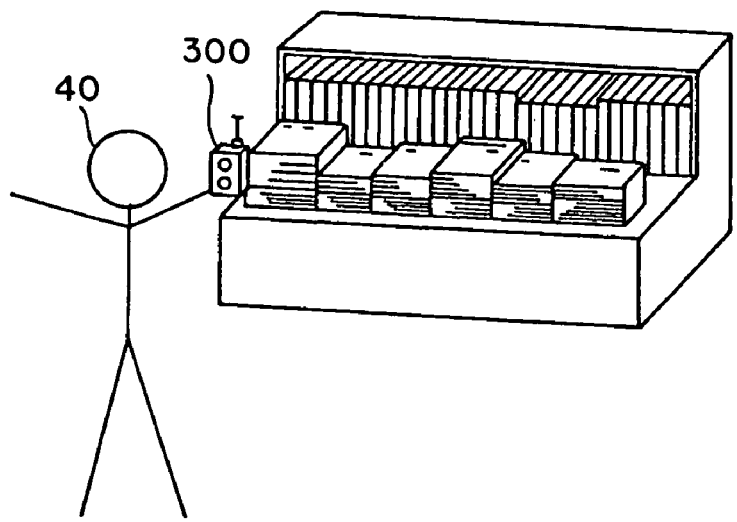
FIG. 19 is an explanatory diagram showing an example of application of the access control management method according to the present invention.

As shown in FIG. 19, when the user 40 executes operation at the operation unit 34 to photograph at a book store by a camera contained in the portable telephone, the operation contents are transmitted to the CPU 21. The CPU 21 activates a camera photographing application as the subject 15 according to the operation contents. The camera photographing application requests the OS to activate a camera driving driver as the object 113, for example. However, there exists an access policy containing a policy to inhibit camera photographing, the OS refrains from activating the camera driving driver and replies to the camera photographing application that no activation is allowed.

The internal control of a portable telephone as described in the foregoing inhibits camera photographing at a book store. Although for the simplicity of description, such expression as "the CPU 21 conducts execution" and "the application conducts execution" are used, the CPU 21 in practice executes processing according to a program. Operation of the CPU 21 according to an application program leads to execution of the application.

The present invention enables an access control method at a terminal device to be dynamically changed to a method most suitable for an environment in which the terminal device is located. In addition, at the time of executing the access control management method, an increase in the entire system costs can be suppressed.

According to the present invention, placing an environment information distribution unit within a geographical region (e.g. book store, concert hall, etc.) in which access control of a portable terminal device is required enables an access policy to be downloaded and applied to an OS in the portable terminal device according to the geographical region in which the portable terminal device is located. Moreover, even when an environment information holding unit is not disposed at each geographical region, as long as such an environment information distribution unit exists which is capable of transmitting information for generating environment information regardless of the geographical region as a GPS satellite, it is possible to download an access policy to apply the same to the portable terminal device according to information transmitted therefrom. In other words, the present invention is applicable in a wider range where limiting a function of a portable terminal device is required.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. An access control management method which limits a request from an application program to access resources for use in realizing functions owned by a terminal device mounted with an operating system and said application program, comprising the steps of:

in said terminal device, storing at least one access policy in a storage region in advance, externally receiving environment information which is information that can specify an environment in which said terminal device is placed, said environmental information being selected from a group comprising a unique identifier for a position unitarily assigned to a specific location, satellite position information, and kind of environment, requesting, to a conversion device which provides said terminal device with correspondence between environment information and access policies, specific information which specifies an access policy that indicates for which resource from which application program access should be limited and that is adapted to received environment information, said conversion device is remotely located from the terminal device and provides a rewritable table for setting corresponding relationships between the environmental information and an access policy identifier and converts the environmental information to the access policy identifier by using said rewritable table, said access policy identifier is said specific information, selecting an access policy indicated by specific information provided by said conversion device from said storage unit which stores at least one access policy, and executing access control of limiting an access request from said application program according to a selected access policy.

2. The access control management method as set forth in claim 1, further comprising the steps of:

when an access policy indicated by specific information provided by said conversion device dose not exist in said storage unit, downloading said access policy from an external data base which holds access policies, and when there already exists an access policy indicated by said specific information in said storage unit, using said access policy in said storage unit without downloading.

3. An access control management system which limits a request from an application program to access resources for use in realizing functions owned by a terminal device mounted with said application program, comprising:

an environment information transmission device which transmits environment information as information that can specify an environment in which said terminal device is placed, said environmental information being selected from a group comprising a unique identifier for a position unitarily assigned to a specific location, satellite position information, and kind of environment, and a conversion device which provides correspondence between environment information and access policies, wherein said terminal device includes a storage unit which stores at least one access policy, an environment information reception unit which receives environment information from said environment information transmission device, an environment information notification unit which requests, from said conversion unit, specific information that specifies an access policy that indicates for which resource from which application program access should be limited and that is adapted to received environment information, an access policy selection unit which selects, from said storage unit, an access policy indicated by specific information provided from said conversion device, and an access control management unit which executes access control of limiting an access request from said application program according to an access policy selected by said access policy selection unit wherein said conversion device is remotely located from the terminal device and provides a rewritable table for setting corresponding relationships between the environmental information and an access policy identifier which is said specific information and converts the environmental information to said access policy identifier by using said rewritable table according to a request from said terminal device.

4. The access control management system as set forth in claim 3, wherein said terminal device includes an access policy operation management unit which checks whether there exists an access policy indicated by specific information provided from said conversion device, and an access policy download unit which downloads an access policy adapted to environment information from said external data base to make said storage unit store said access policy, said access policy operation management unit requests said access policy download unit to download said access policy, when an access policy indicated by specific information does not exist in said storage unit.

5. A terminal device with an access control management function which is mounted with an application program and limits a request from said application program to access resources for use in realizing functions, comprising:

a storage unit which stores at least one access policy, an environment information reception unit which receives environment information from an environment information transmission device, said environmental information being selected from a group comprising a unique identifier for a position unitarily assigned to a specific location, satellite position information, and kind of environment, an environment information notification unit which requests, to a conversion unit which is remotely located from the terminal device and provides a rewritable table for setting corresponding relationships between environment information and access policies and converts the environmental information to said access policy identifier by using said rewritable table, said access policy identifier is said specific information which specifies an access policy that indicates for which resource from which application program access should be limited and that is adapted to received environment information, an access policy selection unit which selects, from said storage unit, an access policy indicated by specific information provided from said conversion device, and an access control management unit which executes access control of limiting an access request from said application program according to an access policy selected by said access policy selection unit.

6. The terminal device with an access control management function as set forth in claim 5, further comprising:

an access policy operation management unit which checks whether there exists an access policy indicated by specific information provided from said conversion device in said storage unit, and an access policy download unit which downloads an access policy adapted to environment information from said external data base to make said storage unit store said access policy, wherein said access policy operation management unit requests said access policy download unit to download said access policy, when an access policy indicated by specific information dose not exist in said storage unit.

7. The terminal device with an access control management function as set forth in claim 5, wherein said terminal device is a portable telephone.

* * * * *